United States Patent
Dillon

(10) Patent No.: US 12,439,319 B2
(45) Date of Patent: Oct. 7, 2025

(54) MOBILITY MULTI-TRANSPORT SOFTWARE-DEFINED WIDE AREA NETWORK (SD-WAN)

(71) Applicant: Hughes Network Systems, LLC, Germantown, MD (US)

(72) Inventor: Douglas Merrill Dillon, Rockville, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 495 days.

(21) Appl. No.: 18/092,035

(22) Filed: Dec. 30, 2022

(65) Prior Publication Data

US 2024/0224155 A1 Jul. 4, 2024

(51) Int. Cl.
*H04L 45/24* (2022.01)
*H04B 7/185* (2006.01)
*H04W 40/12* (2009.01)

(52) U.S. Cl.
CPC ........ *H04W 40/12* (2013.01); *H04B 7/18582* (2013.01); *H04B 7/18584* (2013.01)

(58) Field of Classification Search
None
See application file for complete search history.

(56) References Cited

U.S. PATENT DOCUMENTS

| | | |
|---|---|---|
| 7,398,552 B2 | 7/2008 | Pardee et al. |
| 9,240,950 B2 | 1/2016 | Vedula et al. |
| 9,634,945 B2 | 4/2017 | Stevens et al. |
| 9,716,659 B2 | 7/2017 | Dillon |

(Continued)

FOREIGN PATENT DOCUMENTS

WO 2022251786 A1 12/2022

OTHER PUBLICATIONS

Douglas Dillon, "U.S. Appl. No. 62/861,258", filed Jun. 13, 2019.

(Continued)

*Primary Examiner* — Minh Trang T Nguyen
(74) *Attorney, Agent, or Firm* — Mannava & Kang, P.C.

(57) ABSTRACT

A system and method for managing handoff in software-defined wide area network (SD-WAN) in aero or mobility situations, where terminal is capable of switching across multiple high throughput satellite (HTS), low-latency wireless spot beams and cell. The system receives at least one packet for upstream/downstream transmission over communication network. The system classifies packets based on data types associated with packets and assigns wireless path associated with first network transport modem for upstream/downstream transmission of packets classified as interactive traffic data type. Furthermore, system assigns satellite path associated with second network transport modem for upstream/downstream transmission of packets classified as bulk traffic data type. Further, system estimates available capacity for upstream/downstream transmission of packets associated with first and/or second network transport modem. Furthermore, system adjusts rate limited priority queue for continuity of TCP connection corresponding to packets, responsive to change in network conditions of communication network during the upstream/downstream transmission.

28 Claims, 8 Drawing Sheets

(56) References Cited

U.S. PATENT DOCUMENTS

| | | |
|---|---|---|
| 9,832,131 B2 | 11/2017 | Vedula et al. |
| 9,832,169 B2 | 11/2017 | Border et al. |
| 10,044,620 B2 | 8/2018 | Dillon |
| 10,178,035 B2 | 1/2019 | Dillon |
| 10,637,782 B2 | 4/2020 | Dillon et al. |
| 11,272,350 B2 | 3/2022 | Oza et al. |
| 11,381,511 B2 | 7/2022 | Chin et al. |
| 2020/0396150 A1 | 12/2020 | Dillon |
| 2022/0209855 A1 | 6/2022 | Montgomery et al. |
| 2022/0209856 A1 | 6/2022 | Oza et al. |
| 2022/0209860 A1 | 6/2022 | Oza |
| 2022/0303203 A1 | 9/2022 | Dillon |
| 2023/0116163 A1* | 4/2023 | Scholz ............... H04L 61/2567 370/392 |

OTHER PUBLICATIONS

Michael Chin, et al., "U.S. Appl. No. 62/902,153", filed Sep. 18, 2019.

* cited by examiner

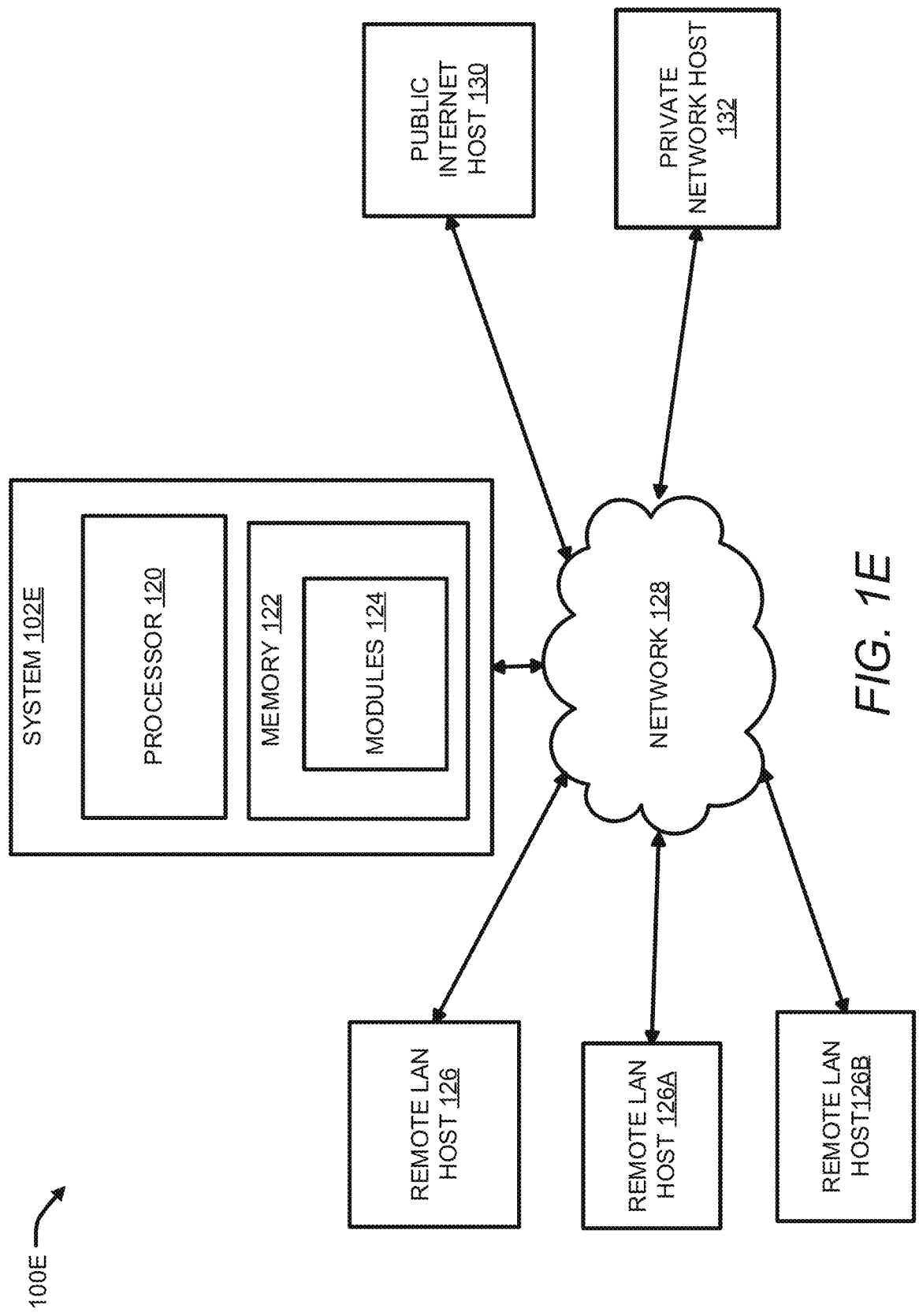

MOBILITY MULTI-TRANSPORT SOFTWARE-DEFINED WIDE AREA NETWORK (SD-WAN)

TECHNICAL FIELD

This patent application is directed to satellite communication systems and, more specifically, to systems and methods for managing a handoff in a software-defined wide area network (SD-WAN) in aero or mobility environments, such as in situations where a terminal may be capable of switching across multiple high throughput satellite (HTS), low-latency wireless spot beams and cells.

BACKGROUND

Advances in telecommunications technologies have led to the availability of high-quality voice and data services to consumers. With emerging technologies, consumers may transmit and receive increasingly larger amounts of multimedia digital content, such as texts, streaming audio or video, social media or web content, digital entertainment, interactive gaming, or other digital content.

In general, satellite communication systems may also be used to provide voice and data services using high throughput satellite (HTS) systems. The HTS systems may support a higher number of "spot beams" to cater to ever-growing consumer demand. Further, networks of the HTS systems may use "spot beams" with a frequency reuse to increase the capacity of a given satellite which includes limited spectrum constraints. Similarly, networks of ground-based wireless systems may use "cells" with frequency reuse to increase the capacity available to the network, which includes limited spectrum constraints.

Although HTS systems provide high throughput, high availability, and broad coverage, geosynchronous HTS systems may suffer from poor responsiveness, for example, in scenarios directed to secure webpage retrieval and other highly interactive applications. In some instances, poor responsiveness may be due to a long round-trip delay over satellite and a number of round-trip transactions used by the highly interactive applications. Additionally, by using a tracking antenna, a terminal associated with the HTS systems may be used in mobility settings, providing network connectivity, for example, to airplanes, cars, trucks, ships, boats, and/or other mobile vehicles or systems.

Similarly, the networks of ground-based wireless systems, such as cellular telephony services, air-to-ground networks, etc., may provide a connectivity with a low latency, and/or other types of degraded network performance. Furthermore, the cost per gigabyte associated with the ground-based wireless systems for a bulk transfer of data may be higher than the HTS systems.

In view of the above, there may be a need for systems and methods for addressing at least the above-mentioned problems in the existing approaches by providing a seamless low latency connectivity to the highly interactive applications, high-speed data transfer and data capacity, and low-cost per gigabyte for the bulk transfer connectivity to mobile users.

BRIEF DESCRIPTION OF DRAWINGS

Features of the disclosed embodiments are illustrated by way of example and not limited in the following Figure(s), in which like numerals indicate like elements, in which:

FIG. 1E illustrates a block diagram representing a network architecture for a system, which includes a processor and a memory comprising modules, according to an example.

DETAILED DESCRIPTION

Figure 1A:
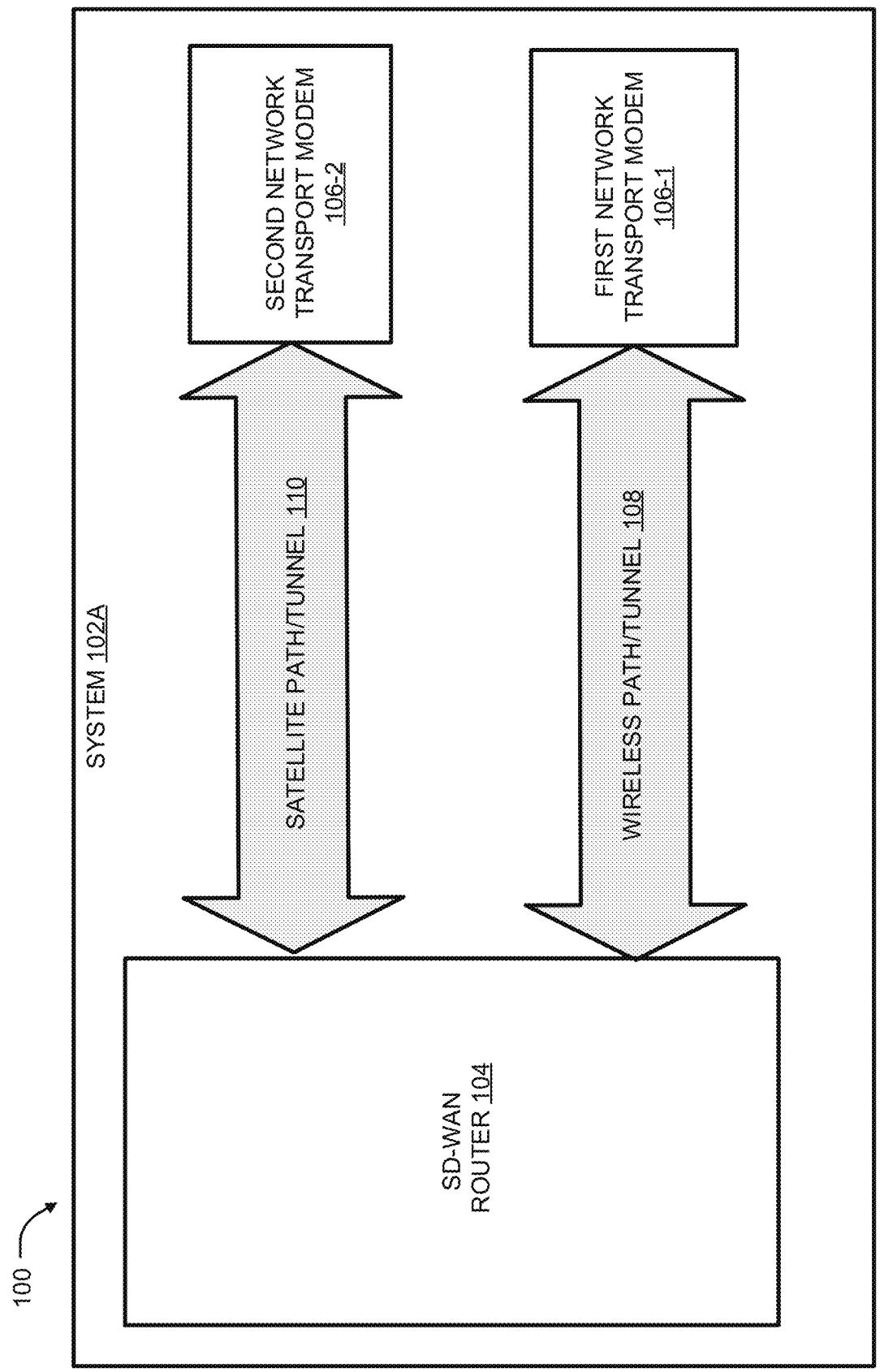
FIG. 1A illustrates a block diagram representing a network architecture for a system for managing a handoff in a software-defined wide area network (SD-WAN) in aero or mobility situations, according to an example.

For simplicity and illustrative purposes, the proposed approach and solutions are described by referring mainly to examples and embodiments thereof. In the following description, numerous specific details are set forth in order to provide a thorough understanding of the proposed approach and solutions. It will be readily apparent, however, that the proposed approach and solutions may be practiced without limitation to these specific details. In other instances, some methods and structures readily understood by one of ordinary skill in the art have not been described in detail so as not to unnecessarily obscure the ongoing description. As used herein, the terms "a" and "an" are intended to denote at least one of a particular element, the term "includes" means includes but not limited to, the term "including" means including but not limited to, and the term "based on" means based at least in part on, the term "based upon" means based at least in part upon, and the term "such as" means such as but not limited to. The term "relevant" means closely connected or appropriate to what is being performed or considered.

In some implementations, networking devices may manage traffic over multiple wide area network (WAN) transport modems, for example, different physical network interfaces or physical connections, to provide high performance in different situations. Multiple network transport modems may be used concurrently, with devices selecting the network transport modem to be used for each packet or group of packets according to the requirements of requesting applications. For example, a network device may include a classifier that classifies packets as an interactive traffic (e.g., web pages) or a bulk traffic (e.g., streaming media, file downloads, and/or other file types.). The network device may then select the best available network transport for each type of the traffic and use the selected transport modem to transmit the data.

As an example, a router may have access to a first network transport modem and a second network transport modem, with both being available concurrently and both providing different performance characteristics. The router may use a classifier to assign packets to be transmitted to different classes, for example, different classes of service, and then use the class assignments and expected latencies for transmission to select which network transport modem to use to transmit the packets. For example, the router may select, to send packets that are not sensitive to latency (e.g., bulk transfers) over the network transport modem having a lowest data usage cap, lowest cost, highest throughput, and/or other advantages. For packets that are very latency-sensitive, the router may select to send packets over a lowest-latency connection.

The multiple network transport modems may be available concurrently and the network device may concurrently use both transport modems. This may include splitting a single Internet Protocol (IP) flow across the multiple transport modems, which may often provide overall latency, throughput, and other performance results. Such network devices may establish a packet tunnel for each different network transport modem and tunneled packets may include resequencing information, such as an IP flow identifier and a sequence number indicating a position of the packet in the sequence. At the receiving side, the packets received through multiple tunnels may be "un-tunneled" and the various IP flows may be reconstructed based on re-sequencing of the information.

The selection of a network transport modem may be performed at a fine-grained level, e.g., for each packet or group of packets. The selection of a network transport modem for a given packet may also account for dynamically changing network conditions of the associated communication network. Rather than simply assuming that the baseline or ideal conditions prevail for the different network transport modems, the network device may use observed and actual network conditions for the network transport modems to estimate the latency that would be experienced at that instant time and for the specific packet being processed.

The disclosed technology falls generally within the field of networking technology and deals with the subjects of: an internet access, including with applications to virtual private network (VPN) provided private networking, a WAN optimization, e.g., whereby existing internet and VPN networking is optimized or improved to provide for quality-of-service (QOS) overlay which support with multiple classes of services across a broadband connection which does not support QoS itself, a satellite communications, e.g., where geosynchronous satellites may provide ubiquitous connectivity but operate with an order of magnitude higher latency than terrestrial network connectivity and where TCP spoofing may be used to reduce the effect of latency on bulk transfer throughput, wireless cell phone-oriented networking, e.g., using technologies such as fourth generation (4G), long term evolution (LTE) and fifth generation (5G), sixth generation (6G), and/or other wireless technologies, to provide wireless connectivity to the internet; software-defined wide area networking (SD-WAN), e.g., where multiple (typically two) broadband transports are combined to provide better service and availability than what is provided by either transport individually.

The techniques described herein may be referred to as an agile-switching active-path (ASAP) feature that may be used in acceleration appliances and other WAN optimization technologies. As discussed below, the system may adaptively switch between using satellite-based network access technology and other network access technology (e.g., cellular network access, wired network access, etc.), or provide different types of traffic on the different access technologies, to achieve, for example, improved throughput, lower latency, lower cost, and other benefits.

Various examples of systems and methods for managing a handoff in a software-defined wide area network (SD-WAN) in aero or mobility situations, especially where a terminal may be switching across multiple high throughput satellite (HTS), low-latency wireless spot beams and cells, may be provided. Various example implementations of the disclosed approach herein may provide systems and methods for seamless handoff of spot beam and cells in an aero, a maritime, and land mobile setting, where a terminal may shift occasionally from one geostationary earth orbit (GEO) spot beam to another GEO spot beam, and/or from one low earth orbit (LEO) satellite to another LEO satellite, or from one wireless cell to another wireless cell. Furthermore, the system and method may combine a spot beam satellite wide area network (WAN) transport modem with a low latency wireless transport modem in mobility situations. Additionally, the system and method may provide a persistence of continuity of end-user transmission control protocol (TCP) and other traffic across a high throughput satellite (HTS) spot beam handoff. Furthermore, the system and method may adjust rate limiters for TCP continuity and estimate available capacity of upstream and downstream transmission of packets across each WAN transport modem.

In an embodiment, the capacity estimation may be based on packet loss as evidence of overdriving a WAN transport modem and using the throughput achieved in the presence of packet loss as a measure of the available capacity of the WAN transport modem. Furthermore, the system and method may provide a continuity of a performing enhancing proxied (PEP'ed) TCP connections across a single WAN transport outage. Furthermore, the systems and methods may provide a near-hitless handoff from one spot-beam to another spot beam using a dual-receiver satellite network transport modem. Additionally, the systems and methods may allow responsiveness of the wireless transport modem for high interactive applications with lower cost per gigabyte (GB) data using wireless transport modem and higher capacity of the satellite transport modem for bulk transfers.

The system and methods described herein may receive at least one packet for an upstream transmission over a communication network. For example, the system may classify the at least one packet as at least one of an interactive traffic data type or a bulk traffic data type. Further, the system may assign a wireless path associated with a first network transport modem for the upstream transmission of the at least one packet classified as the interactive traffic data type. Furthermore, the system may assign a satellite path associated with a second network transport modem for the upstream transmission of the at least one packet classified as the bulk traffic data type. Additionally, the system may receive status information and latency parameters from at least one of the first network transport modem or the second network transport modem. The status information may include at least one of a wireless cell Identity (ID) received from the first network transport modem or a satellite spot beam Identity (ID) received from the second network transport modem. Further, the system may estimate, based on the received status information and the latency parameters, available capacity for the upstream transmission of the at least one packets, associated with the at least one of the first network transport modem or the second network transport modem. Furthermore, the system may prioritize, based on the estimated available capacity for the upstream transmission of the at least one packet, the interactive traffic data type, and the bulk traffic data type across at least one of the first network transport modem or the second network transport modem. The interactive traffic data type and the bulk traffic data type may be prioritized using a rate-limited priority queue. Additionally, the system may adjust, based on the received status information and the latency parameters, the rate-limited priority queue for a continuity of a transmission control protocol (TCP) connection corresponding to the upstream transmission of the at least one packet, change in network conditions of the communication network during the upstream transmission.

Additionally, the system may receive at least one packet for a downstream transmission over the communication network. Further, the system may classify the at least one packet as at least one of the interactive traffic data type or the bulk traffic data type. Furthermore, the system may assign the wireless path associated with the first network transport modem for the downstream transmission of the at least one packet classified as the interactive traffic data type. Additionally, the system may assign the satellite path associated with the second network transport modem for the downstream transmission of the at least one packet classified as the bulk traffic data type. Furthermore, the system may receive status information and latency parameters from at least one of the first network transport modem or the second network transport modem. The status information may include at least one of the wireless cell Identity (ID) received from the first network transport modem or the satellite spot beam Identity (ID) received from the second network transport modem. Additionally, the system may estimate, based on the received status information and the latency parameters, available capacity for the downstream transmission of the at least one packet, associated with the at least one of the first network transport modem or the second network transport modem. Further, the system may prioritize, based on the estimated available capacity for the downstream transmission of the at least one packet, the interactive traffic data type, and the bulk traffic data type across at least one of the first network transport modem or the second network transport modem. The interactive traffic data type and the bulk traffic data type may be prioritized using a rate-limited priority queue. Furthermore, the system may adjust, based on the received status information and the latency parameters, the rate-limited priority queue for a continuity of a transmission control protocol (TCP) connection corresponding to the downstream transmission of the at least one packet, responsive to a change in network conditions of the communication network during the downstream transmission.

Another example implementation may include a method, the method includes receiving at least one packet for an upstream transmission over a communication network. Further, the method may include classifying the at least one packet as at least one of an interactive traffic data type or a bulk traffic data type. Furthermore, the method may include assigning a wireless path associated with a first network transport modem for the upstream transmission of the at least one packet classified as the interactive traffic data type. Additionally, the method may include assigning a satellite path associated with a second network transport modem for the upstream transmission of the at least one packet classified as the bulk traffic data type. Further, the method may include receiving status information and latency parameters from at least one of the first network transport modem or the second network transport modem. The status information may include at least one of a wireless cell Identity (ID) received from the first network transport modem or a satellite spot beam Identity (ID) received from the second network transport modem, respectively. Furthermore, the method may include estimating, based on the received status information and the latency parameters, the available capacity for the upstream transmission of the at least one data packet associated with the at least one of the first network transport modem or the second network transport modem. Additionally, the method may include prioritizing, based on the estimated available capacity for the upstream transmission of the at least one packet, the interactive traffic data type, and the bulk traffic data type across at least one of the first network transport modem or the second network transport modem. The interactive traffic data type and the bulk traffic data type may be prioritized using a rate-limited priority queue. Further, the method may include adjusting, based on the received status information and the latency parameters, the rate-limited priority queue for a continuity of a transmission control protocol (TCP) connection corresponding to the upstream transmission of the at least one packet, responsive to a change in network conditions of the communication network during the upstream transmission.

Additionally, the method may include receiving at least one packet for a downstream transmission over the communication network. Further, the method may include classifying the at least one packet as at least one of the interactive traffic data type or the bulk traffic data type. Furthermore, the method may include assigning the wireless path associated with the first network transport modem for the downstream transmission of the at least one packet classified as the interactive traffic data type. Additionally, the method may include assigning the satellite path associated with the second network transport modem for the downstream transmission of the at least one packet classified as the bulk traffic data type. Further, the method may include receiving status information and latency parameters from at least one of the first network transport modem or the second network transport modem. The status information may include at least one of the wireless cell Identity (ID) received from the first network transport modem or the satellite spot beam Identity (ID) received from the second network transport modem, respectively. Furthermore, the method may include estimating, based on the received status information and the latency parameters, the available capacity for the downstream transmission of the at least one packet, associated with the at least one of the first network transport modem or the second network transport modem. Additionally, the method may include prioritizing, based on the estimated available capacity for the downstream transmission of the at least one packet, the interactive traffic data type, and the bulk traffic data type across at least one of the first network transport modem or the second network transport modem. The interactive traffic data type and the bulk traffic data type may be prioritized using a rate-limited priority queue. Further, the method may include adjusting, based on the received status information and the latency parameters, the rate-limited priority queue for a continuity of a transmission control protocol (TCP) connections corresponding to the downstream transmission of the at least one packet, responsive to a change in network conditions of the communication network during the downstream transmission.

Another example implementation may include a non-transitory computer-readable medium comprising machine-readable instructions that are executable by a processor to receive at least one packet for an upstream transmission and a downstream transmission over a communication network. The processor may classify the at least one as at least one of an interactive traffic data type or a bulk traffic data type. Further, the processor may assign a wireless path associated with a first network transport modem for the upstream transmission and the downstream transmission of the at least one packet classified as the interactive traffic data type. Furthermore, the processor may assign a satellite path associated with a second network transport modem for the upstream transmission and the downstream transmission of the at least one packet classified as the bulk traffic data type. Additionally, the processor may receive status information and latency parameters from at least one of the first network transport modem or the second network transport modem. The status information may include at least one of a wireless cell Identity (ID) received from the first network transport modem or a satellite spot beam Identity (ID) received from the second network transport modem. Further, the processor may estimate, based on the received status information and the latency parameters, the available capacity for the upstream transmission and the downstream transmission of the one or more data packets associated with the at least one of the first network transport modem or the second network transport modem. The available capacity for the upstream transmission and the downstream transmission of the at least one packet may vary response to a change in the spot beam ID or the wireless cell ID. Furthermore, the processor may prioritize, based on the estimated available capacity for the upstream transmission and the downstream transmission of the at least one packet, the interactive traffic data type, and the bulk traffic data type across at least one of the first network transport modem or the second network transport modem. The interactive traffic data type and the bulk traffic data type may be prioritized using a rate-limited priority queue. Additionally, the processor may adjust, based on the received status information and the latency parameters, the rate limited priority queue for a continuity of a transmission control protocol (TCP) connection corresponding to the upstream transmission and the downstream transmission of the at least one packet, responsive to a change in network conditions of the communication network during the downstream transmission.

FIG. 1A illustrates a block diagram representing a network architecture 100 for a system 102A for managing a handoff in a software-defined wide area network (SD-WAN) in aero or mobility situations, according to an example. In some examples, the network architecture 100 may depict a satellite communication system capable of providing at least voice and/or data services. In some examples, the satellite communication may be a high throughput satellite (HTS) system, and/or other satellite types. In one example embodiment, the system 102A includes a software-defined wide area network (SD-WAN) router 104, a first network transport modem 106-1, and a second network transport modem 106-2. The first network transport modem 106-1, and the second network transport modem 106-2 may be connected using a network tunneling. The SD-WAN router 104 may use a different tunnel for each network transport modem available. At least one packet is tunneled between the SD-WAN router 104 and the first network transport modem 106-1, and the second network transport modem 106-2 using a Network Address Translation (NAT) protocol.

For example, a first tunnel, a wireless path/tunnel 108 (hereinafter interchangeably referred to as the wireless path/tunnel 108 may be established for packets exchanged over the first network transport modem 106-1. A second tunnel, a satellite path/tunnel 110 (hereinafter interchangeably referred to as the satellite path 110 or the satellite tunnel 110), may be established for packets exchanged over the second network transport modem 106-2. The wireless path/tunnel 108, and the satellite tunnel 110 may represent the ability of the SD-WAN router 104, to forward packets to the first network transport modem 106-1 and/or the second network transport modem 106-2.

In an embodiment, the first network transport modem 106-1 may correspond to a mobile wireless modem/terminal, and the second network transport modem 106-2 may correspond to a mobile high-throughput satellite (HTS) modem/terminal. In an example embodiment, the second network transport modem 106-2 may include a directional antenna (not shown in FIG. 1), a single directional antenna (not shown in FIG. 1), and/or dual receivers (not shown in FIG. 1). Although, the first network transport modem 106-1 and the second network transport modem 106-2 may typically remain in the same location once mounted, the transport modems may be removed from their mounts, relocated to another location, and/or may be configured to be mobile terminals. For example, the transport modems may be mounted on mobile platforms that facilitate transportation thereof from one location to another. Such mobile platforms may include, for example, any number of mobile vehicles, such as airplanes, cars, buses, boats, trucks, troop-carriers, or other vehicles, and/or other types of vehicles/transporting means. It should be appreciated that such transport modems may generally be operational when still and not while being transported. That said, there may be scenarios where the transport modems may be transportable (mobile) terminals that remain operational during transit.

In an example embodiment, the system 102A may be implemented as a standalone device such as a networking apparatus or device. In an example embodiment, each of the SD-WAN router 104, the first network transport modem 106-1, and the second network transport modem 106-2 may be implemented as a standalone device. In another example embodiment, the SD-WAN router 104, the first network transport modem 106-1, and the second network transport modem 106-2 may be implemented and integrated into an existing network device/network apparatus such as a mobile terminal. The mobile terminal may be used due to more frequent occurrence of outages on one or more wide area network (WAN) connections due to the signal being physically blocked or interfered with (e.g. tunnels, tall buildings, hills, and mountains, and/or other obstacles.), brief outages occurring when shifting from one spot beam to another spot beam, and/or one satellite to another satellite, or one wireless cell to another wireless cell, variations in performance including capacity when shifting from one spot beam to another spot beam, and/or one satellite to another satellite, or one wireless cell to another wireless cell, variations in performance including capacity when the mobile terminal moves from an edge to a center of a spot beam or vice a versa, and/or other mobility scenarios.

The network architecture 100 may include other system elements or components and is not limited to the components shown in FIG. 1. For example, the system may include a SD-WAN gateway as shown in FIG. 1B, a second network transport modem with a directional antenna as shown in FIG. 1C, a second network transport modem with a single antenna and a dual receiver as shown in FIG. 1D, a processor, and a memory comprising modules as shown in FIG. 1E. The disclosed technology may be implemented in different ways as shown in FIGS. 1A to 1E (system 102A, system 102B, system 102C, system 102D, and system 102E).

It should be appreciated that the network architecture 100 and the system(s) are depicted in FIGS. 1A-1E may be a few example implementations. Hence, the network architecture 100 may or may not include additional features and some of the features described herein may be removed and/or modified without departing from the scope of the network architecture 100 outlined herein.

In some examples, the network architecture 100 may also include a private network and/or public network (not shown in FIGS. 1A-1E). The private network and/or public network may include any variations of networks. For example, the private network may be a local area network (LAN), and the public network may be a wide area network (WAN). Also, the private network and/or public network may each be a local area network (LAN), wide area network (WAN), the Internet, a cellular network, a cable network, a satellite network, or other network that facilitates communication between the components of network architecture 100 as well as any external element or system connected to the private network and/or public network. The private network and/or public network may further include one, or any number, of the exemplary types of networks mentioned above operating as a stand-alone network or in cooperation with each other. For example, the private network and/or public network may utilize one or more protocols of one or more clients or servers to which they are communicatively coupled. The private network and/or public network may facilitate the transmission of data according to a transmission protocol of any of the devices and/or systems in the private network and/or public network. Although each of the private network and/or public network may be a single network, it should be appreciated that in some examples, each of the private network and/or public network may include a plurality of interconnected networks as well.

Further, the network architecture 100 may include terminals (not shown in FIGS. 1A-1E) which may be used by, but is not limited to, a user, a customer, an administrator, a network operator, a flight/ship operator, a driver, and/or type of users. Depending on the application, the terminals may include or incorporate any number of antenna dishes, which may be provided in various sizes, depths, or dimensions (e.g., small, medium, or large). Although the terminals may typically remain in the same location once mounted, the terminals may be removed from their mounts, relocated to another location, and/or may be configured to be mobile terminals. For example, the terminals may be mounted on mobile platforms that facilitate transportation thereof from one location to another. Such mobile platforms may include, for example, any number of mobile vehicles, such as airplanes, cars, buses, boats, trucks, troop-carriers, or other vehicles, and/or other type of vehicles/commuting means. It should be appreciated that such terminals may generally be operational when still and not while being transported. That said, there may be scenarios where the terminals may be transportable (mobile) terminals that remain operational during transit. As used herein, the terms "terminal," "customer terminal," "satellite terminal," and/or "very small aperture terminal (VSAT)" may be used interchangeably to refer to these terminal types.

It should be appreciated that any number of customer-premise equipment (CPE) (not shown in FIGS. 1A-1E) may be communicatively coupled to the terminals. In some examples, the customer premise equipment (CPE) may include any number of computing or mobile devices. For example, such a computing or mobile device may include, but is not limited to, a laptop, a tablet, a mobile phone, an appliance, a camera, a sensor, a thermostat, a vehicle, a display, and/or other interfaces. In general, the customer premise equipment (CPE) may include, without limitation, any number of network-enabled computing devices, elements, or systems. It should be appreciated that a network of such devices may be commonly referred to as "Internet of Things" (IoT). The CPE may be provided as a standalone, transport integrated, hybrid integrated, or fully integrated single device solution. In the standalone configuration, all WAN modems and accelerators are provided as standalone devices.

In another example, a point of presence (POP) or a network operation center (NOC) may be included in the network architecture 100. For example, the POP may be instantiated for load balancing and scaling to load. The location of the POP may be strategic to optimize transport modem characteristics such as latency, jitter, throughput, and/or network issues. The POP may include VPN firewalls to block unwanted intrusion or malicious software/connections. The POP may serve as an endpoint to additional VPN tunnels. Multiple VPN firewalls may be desired for scalability and load balancing. The POP may include one or more enterprise routers to route traffic between the accelerator gateway and the public internet. Routers may route traffic to private networks. Multiple routers may exist for scaling and load balancing. For example, the POP may be implemented in the SD-WAN gateway.

Further, the network architecture 100 may include a satellite (not shown in FIGS. 1A-1E) which may be an object intentionally placed into orbit. In some examples, the satellite may be an artificial satellite that may be configured to transmit and receive data signals. For example, the satellite may from one or more beams (e.g., spot beams) and provide connectivity between at least the terminals and the SD-WAN gateway. More specifically, the satellite may communicate data signals using these beams with the terminals via a terminal return channel and a terminal forward channel, and with the gateway via a gateway return channel and a gateway forward channel (not shown). It should be appreciated that the satellite may from any number of beams to communicate data signals with any number of components, even beyond the terminals or the gateway.

In some examples, the satellite may be a communication satellite, such as a high-throughput satellite, which may include any satellite that may be capable of providing at least twice (e.g., 20+ times, 100+ times, etc.) the total amount of throughput as a classic fixed-satellite service (FSS) satellite. In some examples, the satellite may include, but is not limited to, a transponder satellite, a regenerative satellite, and/or other similar satellite that may generate one or more spot beams. Furthermore, in some examples, the satellite may operate in geosynchronous, mid-earth, low-earth, elliptical, or some other orbital configuration. For example, a geostationary earth orbit (GEO) spot beam, a low-earth orbit (LEO) satellite, a medium earth orbit spot beam, and/or other type of spot beam.

While the processors, components, elements, systems, subsystems, and/or other computing devices may be shown as single components or elements, one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the network architecture 100, and components, as shown in FIGS. 1A-1E.

In an example embodiment, the system 102A may configure the first network transport modem 106-1 and/or the second network transport modem 106-2 to transmit status information and latency parameters. In an example embodiment, the status information includes, but is not limited to, a wireless cell Identity (ID), a satellite spot beam Identity (ID), and/or other type of data/IDs.

In an example embodiment, the system 102A may configure the SD-WAN router 104 to receive at least one packet for an upstream transmission over a communication network (not shown in FIG. 1).

In an example embodiment, the system 102A may configure the SD-WAN router 104 to classify the at least one packet based on one or more data types associated with the at least one packet. In an example embodiment, the one or more data types correspond to an interactive traffic data type and a bulk traffic data type. The classification of an IP flow may be changed over the course of the life of the IP flow so that startup handshake packets (for example the various packets in an HTTPs connection leading up to and including the beginning of the HTTP response header and optional response body) are classified to prefer the low-latency wireless WAN connection and to be carried at a higher priority when the quality of service (QOS) is provided.

In an example embodiment, the system 102A may configure the SD-WAN router 104 to assign the wireless path/tunnel 108 associated with the first network transport modem 106-1 for the upstream transmission of the at least one packet classified as the interactive traffic data type.

In an example embodiment, the system 102A may configure the SD-WAN router 104 to assign the satellite path 110 associated with the second network transport modem 106-2 for the upstream transmission of the at least one packet classified as the bulk traffic data type. For example, the packet may be classified either as part of bulk traffic or part of interactive traffic.

In an example embodiment, the system 102A may configure the SD-WAN router 104 to receive status information and latency parameters from at least one of the first network transport modem 106-1 or the second network transport modem 106-2. In an example embodiment, the status information includes the wireless cell Identity (ID) received from the first network transport modem 106-1 or the satellite spot beam Identity (ID) received from the second network transport modem 106-2. In an example embodiment, the received status information from the first network transport modem 106-1 includes, but is not limited to, connectivity status, the wireless cell ID, an estimated upstream capacity, an estimated downstream capacity, and/or other type of information. Further, the received status information from the second network transport modem 106-2 includes, but is not limited to, a connectivity status, the spot beam ID, an estimated upstream and a downstream capacity, a upstream modulation, and/or a Forward Error-Correcting Code (FEC) setting, a downstream modulation and/or a Forward Error-Correcting Code (FEC) setting, a downstream signal strength or quality, and/or other type of information. In an example embodiment, the status information and the latency parameters include, but are not limited to, an excessive latency, a packet loss, status information from the first network transport modem 106-1 and the second network transport modem 106-2, brief throughput tests when entering a new spot beam or a cell, and/or other type of network coverage areas.

In an example embodiment, the system 102A may configure the SD-WAN router 104 to estimate, based on the received status information and the latency parameters, available capacity for the upstream transmission and the downstream transmission of the at least one packet associated with the at least one of the first network transport modem 106-1 or the second network transport modem 106-2. In an example embodiment, the available capacity varies when there may be a change in the spot beam ID or the wireless cell ID. The SD-WAN router 104 may combine respective measurements of upstream and a downstream estimated capacity along with measurements of upstream and a downstream estimated capacity from the SD-WAN gateway to arrive at an upstream and a downstream estimated capacity, respectively. The SD-WAN router 104 may then send the estimated downstream capacity to the SD-WAN gateway 112. In other examples, the SD-WAN gateway 112 may determine the estimated upstream capacity and downstream capacity and send the estimated upstream capacity to the SD-WAN router 104. In other example, the SD-WAN gateway 112 may arrive at the upstream estimated capacity and send the estimated upstream capacity to the SD-WAN router 104. Simultaneously, the SD-WAN router 104 may determine the downstream estimated capacity and send the estimated downstream capacity to the SD-WAN gateway. In other example, the computation of the capacity estimate may be distributed between the SD-WAN router 104 and the SD-WAN gateway.

For example, the connectivity status received from the first network transport modem 106-1, is where the SD-WAN router 104 may adjust respective path selection to avoid a path with poor or no connectivity. The cell ID is where the SD-WAN router 104 may take measurements to update more quickly estimated wireless upstream and downstream capacity response to a cell change.

Further, the estimated upstream capacity is where the SD-WAN router 104 may incorporate this value into a respective estimate of wireless upstream capacity and thereby adjust the rate limit of a respective priority queue. Additionally, the estimated downstream capacity is where the SD-WAN router 104 forwards the estimated downstream capacity to the SD-WAN gateway 112. The estimated downstream capacity value may be incorporated into the estimate of the SD-WAN gateway 112 regarding the wireless downstream capacity and thereby adjusting the rate limit of respective priority queues.

For example, the connectivity status of the second network transport modem 106-2 may include a scenario where the SD-WAN router 104 may adjust its path selection to avoid a path with poor or no connectivity. Further, the spot beam ID from the second network transport modem 106-2 may include a scenario where the SD-WAN router 104 may take measurements to update respective estimated HTS upstream and downstream capacity to respond to a spot beam change more quickly.

Furthermore, the estimated upstream capacity is where the SD-WAN router 104 may incorporate this value into its estimate of HTS upstream capacity, and thereby adjusting the rate limit of the respective priority queue. Further, the estimated downstream capacity is where the SD-WAN router 104 forwards this to the SD-WAN gateway 112 which may incorporate this value into an estimate from the SD-WAN gateway 112, regarding the HTS downstream capacity, and thereby adjusting the rate limit of the respective priority queue. Additionally, the upstream modulation and/or forward error-correcting code (FEC) setting is where the SD-WAN router 104 may incorporate this value into a respective estimate of HTS upstream capacity, and thereby adjusting the rate limit of a respective priority queue.

Additionally, downstream modulation and/or forward error-correcting code (FEC) setting is where the SD-WAN router 104 forwards the downstream modulation and/or FEC to the SD-WAN gateway, which may incorporate this value into an estimate of the SD-WAN gateway of HTS downstream capacity and thereby adjust rate limit of the respective priority queue. Also, the downstream signal strength or quality is where the SD-WAN router 104 may use the downstream signal strength or quality to help adjust the downstream HTS capacity estimate, and thereby adjusting the rate limit of the respective priority queue.

Additionally, the excessive latency may be used to adjust estimated WAN capacity. The SD-WAN router 104 and SD-WAN gateway 112 may send time stamped packets to measure both upstream latency and downstream latency, respectively. In an embodiment, the capacity estimate may be increased when the latency remains close to a baseline value while the connection is carrying traffic at a rate close to the estimated capacity. Similarly, the capacity estimate may be decreased when the latency rises significantly above the baseline latency. The actual received bit rate concurrent with increased latency may be used as a factor to produce the reduced capacity estimate.

In another example, the packet loss may be used to adjust the estimated available (WAN) capacity. The tunneling used to carry packets between the SD-WAN router 104 and the SD-WAN gateway 112, in the preferred embodiment, includes sequence numbers that allow the receiver of the tunneled packets to compute a packet loss rate. The SD-WAN router 104 (and the SD-WAN gateway 112) may monitor both packet loss and received throughput across a WAN connection to estimate the available capacity. The SD-WAN router 104 or the SD-WAN gateway 112 presumes that low packet loss indicates that the WAN connection capacity is not overloaded and may adjust its estimate up, when the received rate may be close to the current estimate. The SD-WAN router 104 or the SD-WAN gateway 112 may presume that high packet loss together with a relatively high received throughput indicates that the WAN connection may be saturated and may adjust down its estimated capacity to the received rate seen during the packet loss.

Further, the SD-WAN router 104 may then pass its estimate of capacity based on packet loss to the SD-WAN gateway 112, which may then incorporate that estimate into its estimate of WAN capacity for adjusting a rate limit of a respective priority queue. Similarly, the SD-WAN gateway 112 may then pass its estimate of capacity based on packet loss to the SD-WAN router 104, which may then incorporate that estimate into its estimate of WAN capacity for adjusting the rate limit of respective priority queue for the SD-WAN router 104, and WAN connection combination.

In an example, the status information may be used to adjust the estimated available capacity. As described earlier, status information may be passed from the second network transport modem 106-2 to the SD-WAN router 104 and from the first network transport modem 106-1 to the SD-WAN router 104, respectively. This status may be used to help adjust estimated available (i.e., WAN) capacity. For example, the system 102A may use changes in signal strength or quality to accelerate (or even restart) the estimation of a WAN connection's upstream and/or downstream capacity. In another example, the system 102A may use changes in spot beam ID or cell ID to accelerate (or even restart) the estimation of a WAN connection's upstream and/or downstream capacity.

Further, the system 102A may use the signaled estimated capacity (upstream and/or downstream) either as an estimate of capacity or as a factor in producing its estimate of capacity. Additionally, the system 102A may use a change in the HTS Upstream or downstream modulation and/or forward error-correcting code (FEC) as an input to adjust the estimate of HTS upstream or downstream capacity. For example, a shift from a rate $\frac{3}{4}$ to a rate $\frac{1}{2}$ FEC encoding could be used to adjust down the capacity estimate by the appropriate amount ($\frac{1}{3}$).

Additionally, brief throughput tests may be used to adjust the estimated WAN capacity. The brief (e.g., 3 seconds) throughput test may be used, where the system 102A forces more traffic than a WAN connection may be expected to carry. The system 102A may use the resulting stream of packets (frequently with significant packet loss) to estimate the capacity, for example, by using the measured receive rate as that estimate. Further, brief throughput tests may optionally be performed following an outage and after moving from one spot beam or cell to another spot beam or cell.

When operating with a wireless network with built-in quality of service (QOS), SD-WAN router 104 and SD-WAN gateway 112 may tag each packet with its desired class of service (COS) for example, using the appropriate differentiated services code point (DSCP) code point for each such class of service. The SD-WAN router 104 and the SD-WAN gateway 112, in one embodiment, measure one-way latency, packet loss rate, and rate-limited queue for each class of service. Therefore, SD-WAN router 104 and the SD-WAN gateway 112 estimate a packet's latency based on the estimated throughput and latency of its class of service and the backlog of packets queued for a WAN connection and class of service combination. An alternative embodiment includes sending all packets with the default class of service (e.g., a DSCP of 0) and operating as if the wireless network did not have built-in QoS.

In an example embodiment, the system 102A may configure the SD-WAN router 104 to prioritize the interactive traffic data type and the bulk traffic data type across at least one of the first network transport modem 106-1 or the second network transport modem 106-2, using a rate-limited priority queue, based on the estimated available capacity for the upstream transmission of the at least one packet.

In an example embodiment, the system 102A may execute the SD-WAN router 104 to adjust, based on the received status information and the latency parameters, the rate-limited priority queue for a continuity of a transmission control protocol (TCP) connection corresponding to the upstream transmission of the at least one packet, responsive to a change in network conditions of the communication network during the upstream transmission.

The examples of the systems and methods herein may be used in mobile internet access, including with applications to a virtual private network (VPN) provided private networking. Further, systems and methods herein may enable WAN optimization, in which existing Internet and VPN networking may be optimized or improved to provide for a Quality-Of-Service (QOS) overlay which supports multiple classes of services across a broadband connection, which does not support QoS itself. Furthermore, systems and methods herein may be used in mobile satellite communications. For example, where geosynchronous satellites may provide ubiquitous connectivity, however, operate with an order of magnitude higher latency than terrestrial network connectivity and where TCP PEP'ed may be used to reduce the effect of latency on bulk transfer throughput. Additionally, systems and methods herein may be used in wireless cell phone-oriented networking, using technologies such as 4G, LTE, 5G, and 6G to provide wireless connectivity to the Internet. Further, the systems and methods herein may be used in the SD-WAN, where multiple (typically two) broadband transport modems are combined to provide better service and availability than what is provided by either transport individually.

In an alternate embodiment, the first network transport modem 106-1 may correspond to the mobile wireless modem/terminal or the mobile high-throughput satellite (HTS) modem/terminal, and the second network transport modem 106-2 may correspond to a mobile low earth orbit (LEO) modem/terminal, as a low latency transport. In some examples, the satellite communication may be a geostationary (GEO) high throughput satellite (HTS) system, and/or a low earth orbit (LEO) satellite system.

For example, the connectivity status of the second network transport modem 106-2 may include a scenario where the SD-WAN router 104 may adjust its path selection to avoid a path with poor or no connectivity. Further, a satellite ID from the second network transport modem 106-2 may include a scenario where the SD-WAN router 104 may take measurements to update respective estimated LEO upstream and downstream capacity to respond to a satellite change more quickly.

Furthermore, estimated LEO upstream capacity may be where the SD-WAN router 104 may incorporate this value into its estimate of HTS upstream capacity, and thereby adjusting the rate limit of the respective priority queue. Further, the estimated downstream capacity may be where the SD-WAN router 104 forwards this to the SD-WAN gateway 112 which may incorporate this value into an estimate from the SD-WAN gateway 112, regarding the HTS downstream capacity, and thereby adjusting the rate limit of the respective priority queue. Additionally, the upstream modulation and/or forward error-correcting code (FEC) setting may be where the SD-WAN router 104 may incorporate this value into a respective estimate of HTS upstream capacity, and thereby adjusting the rate limit of a respective priority queue.

Figure 1B:
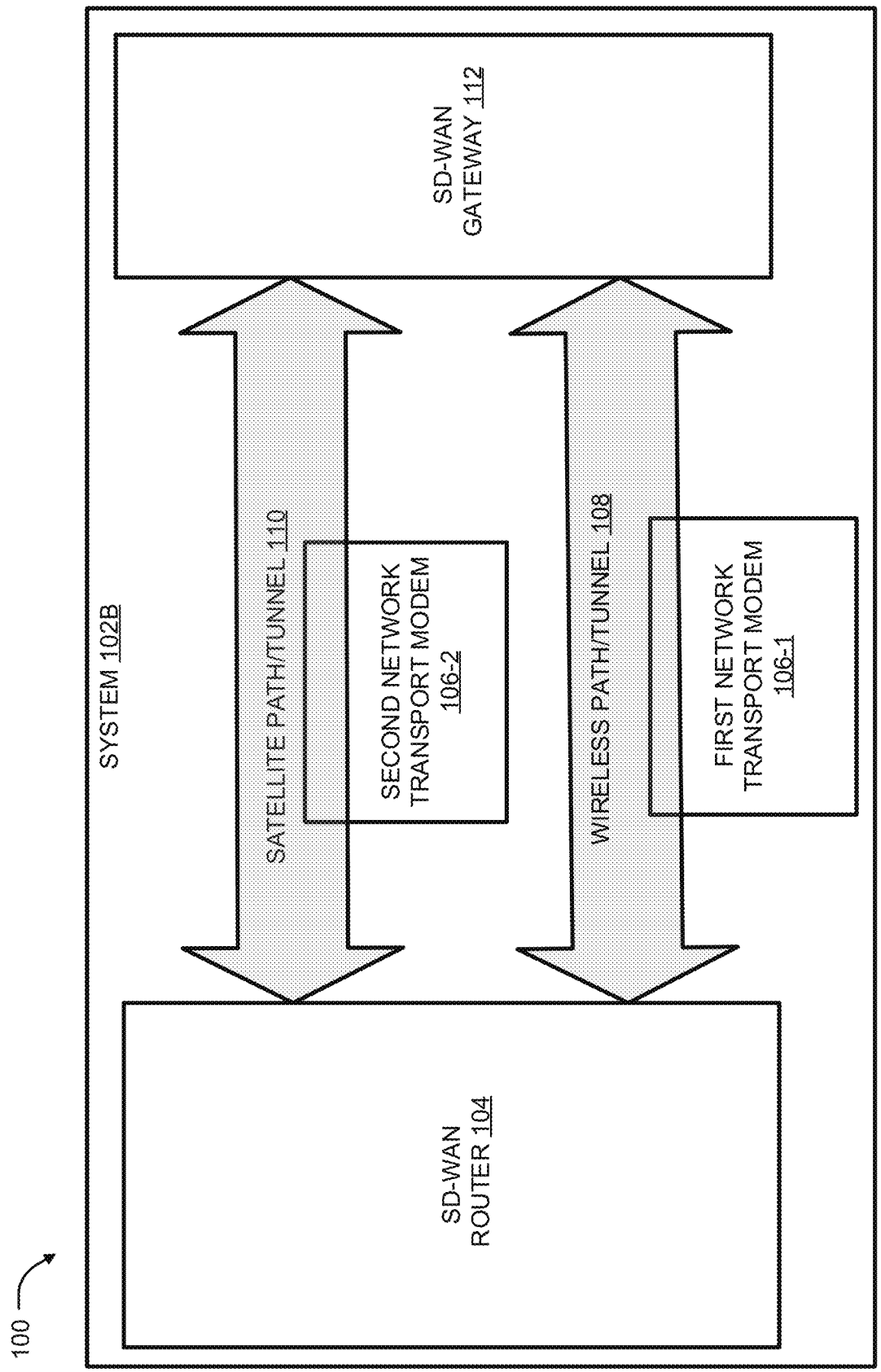
FIG. 1B illustrates a block diagram representing a system, which includes a SD-WAN router and a SD-WAN gateway, according to an example.

FIG. 1B illustrates a block diagram representing a system 102B, which includes the SD-WAN router 104 and a SD-WAN gateway 112, according to an example. The configuration and working of the system 102B may be similar to the system 102A. It should be appreciated that the system 102B depicted in FIG. 1B may be an example. Hence, system 102B may or may not include additional features and some of the features described herein may be removed and/or modified without departing from the scopes of the system 102B outlined herein.

In an example embodiment, the system 102B may configure the SD-WAN gateway 112 to receive at least one packet for a downstream transmission over the communication network.

In an example embodiment, the system 102B may configure the SD-WAN gateway 112 to classify the at least one packet based on one or more data types associated with the at least one packet. In an example embodiment, the one or more data types correspond to an interactive traffic data type and a bulk traffic data type.

In an example embodiment, system 102B may configure the SD-WAN gateway 112 to assign a wireless path/tunnel 108 associated with the first network transport modem 106-1 for the downstream transmission of the at least one packet classified as the interactive traffic data type.

In an example embodiment, the system 102B may configure the SD-WAN gateway 112 to assign the satellite path 110 associated with the second network transport modem 106-2 for the downstream transmission of the at least one packet classified as the bulk traffic data type.

In an example embodiment, the system 102B may configure the SD-WAN gateway 112 to receive status information and latency parameters from at least one of the first network transport modem 106-1 or the second network transport modem 106-2, respectively. In an example embodiment, the status information includes, but is not limited to, the wireless cell Identity (ID), the satellite spot beam Identity (ID), and/or other type of information received from at least one of the first network transport modem 106-1 or the second network transport modem 106-2, respectively;

In an example embodiment, the system 102B may configure the SD-WAN gateway 112 to estimate, based on the received status information and the latency parameters, the available capacity for the downstream transmission of the at least one packet associated with the at least one of the first network transport modem 106-1 or the second network transport modem 106-2. In an example embodiment, the available capacity for the downstream transmission of the at least one packet varies responsive to a change in the spot beam ID or the wireless cell ID.

In an example embodiment, the system 102B may configure the SD-WAN gateway 112 to prioritize, based on the estimated available capacity for the downstream transmission of the at least one packet, the interactive traffic data type, and the bulk traffic data type across at least one of the first network transport modem 106-1 or the second network transport modem 106-2. The interactive traffic data type and the bulk traffic data type may be prioritized using a rate-limited priority queue.

In an example embodiment, the system 102B may configure the SD-WAN gateway 112 to adjust, based on the received status information and the latency parameters, the rate-limited priority queue for a continuity of a transmission control protocol (TCP) connection corresponding to the downstream transmission of the at least one packet, responsive to a change in network conditions of the communication network during the downstream transmission. In an example embodiment, the continuity of the TCP connection may be optimized using a TCP Performing Enhancing Proxied (PEP'ed) technique. In an example embodiment, the PEP'ed TCP connections includes unacknowledged backbone connection packets that may be carried by a WAN transport (for example, at least one of the first network transport modem 106-1 or the second network transport modem 106-2) that has entered an outage. In an example embodiment, the system 102B may shift the unacknowledged backbone connection packets from the WAN transport that is in the outage to a remaining WAN transport that is not in an outage.

The TCP Performance Enhancing Proxied (PEP'ed) technique, involves terminating the TCP protocol in the SD-WAN router 104 and the SD-WAN gateway 112. Further, the TCP PEP'ed technique may carry the proxied TCP traffic across the WAN using a WAN-friendly backbone connection. When a WAN that was carrying traffic of the TCP PEP'ed connection, suffers an outage (or severely impaired ability to carry packets), any unacknowledged backbone connection packets are carried via one of the remaining WAN transport's tunnels. This ensures continuity across the frequent brief outages that occur in a mobility setting. This prevents an existing TCP PEP'ed connection from becoming "stuck" during such a single WAN outage.

In an example embodiment, the change in the network conditions (in the context of downstream transmission) may be responsive to one or more of, but are not limited to, a spot beam handoff event, throughput or latency of the first network transport modem or the second network transport modem, a level of congestion on at least one of the first network transport modem or the second network transport modem, a destination address and a port address of the wireless path or the satellite path, signal strength or quality to accelerate during the estimation of the available capacity, an upstream or a downstream modulation, a forward error-correcting code (FEC), changes in packet loss, and/or other type of network conditions.

In an example embodiment, the system 102B may estimate a latency of the at least one packet. Further, the system 102B may factor the estimated latency of the at least one packet across the at least one of the first network transport modem 106-1 or the second network transport modem 106-2, into the wireless path/tunnel 108 or the satellite path 110. Furthermore, the system 102B may assign an uncongested latency from the estimated latency of the at least one packet, and a backlog of the at least one packet waiting to be transmitted to the rate-limited priority queue.

In another example embodiment, the system 102A and the system 102B may tag the at least one packet with a class of service to provide preference to reduce latency of the at least one packet carrying startup handshake packets associated with a connection.

In another example, the SD-WAN gateway 112 may detect a change in the downstream internet protocol (IP) address and port of the tunnel, and then the SD-WAN gateway 112 may perform downstream transmission of the at least one packet to an updated IP address and a port ID.

In another example, upon being notified of a spot beam shift, the SD-WAN router 104 may immediately transmit one or more upstream transmission packets to the SD-WAN gateway 112. By transmit one or more upstream transmission packets, the SD-WAN gateway 112 may immediately detect a change in the downstream internet protocol (IP) and port of the associated WAN transport tunnel. This may allow the SD-WAN gateway 112 to shift its downstream transmissions to the address and port, and in turn limiting the duration of the handover induced outage.

Figure 1C:
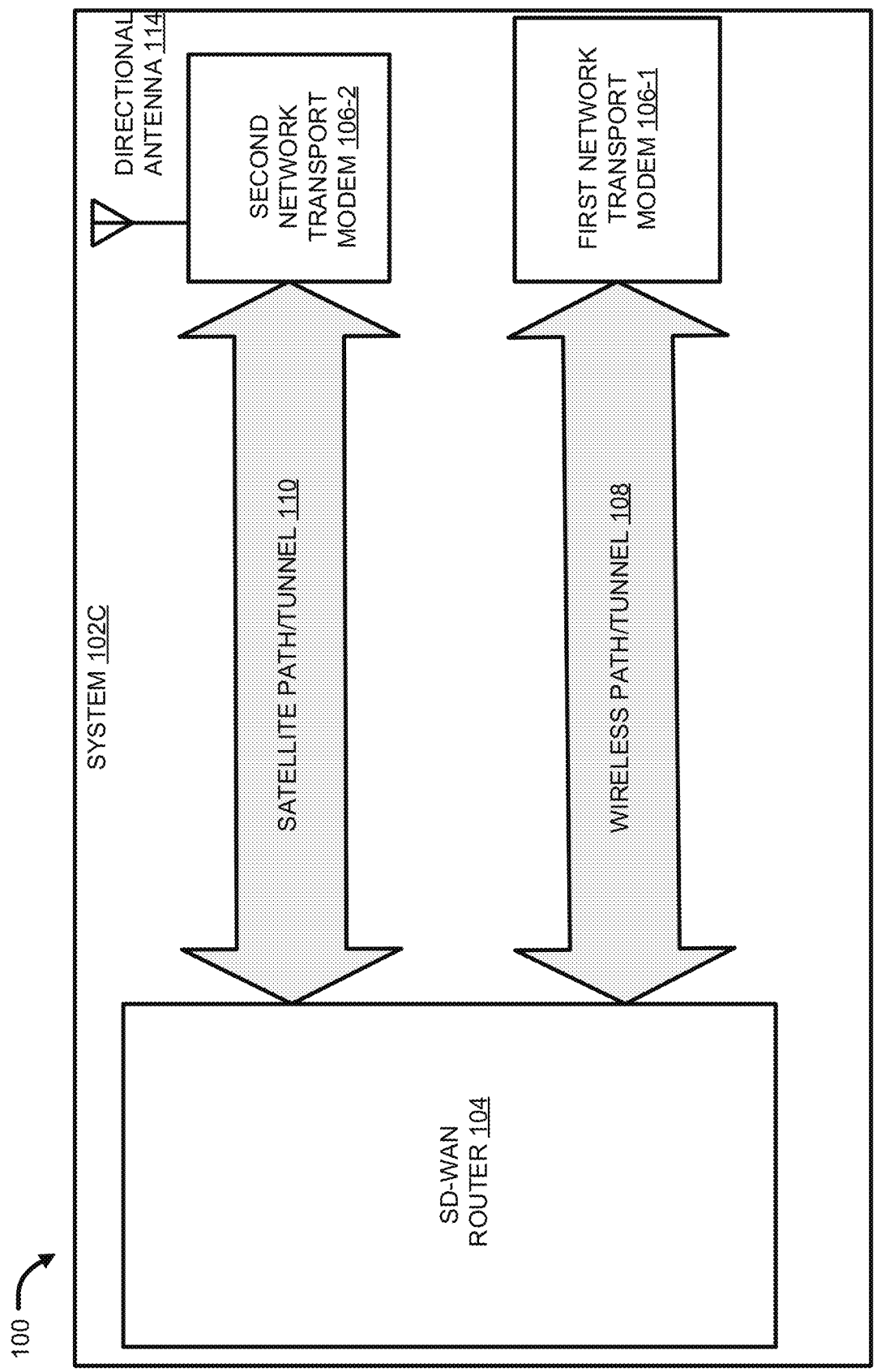
FIG. 1C illustrates a block diagram representing a system, which includes a SD-WAN router, a first network transport modem, and a second network transport modem with a directional antenna, according to an example.

FIG. 1C illustrates a block diagram representing a system 102C, which includes the SD-WAN router 104, the first network transport modem 106-1, and the second network transport modem 106-2 with a directional antenna 114, according to an example.

Figure 1D:
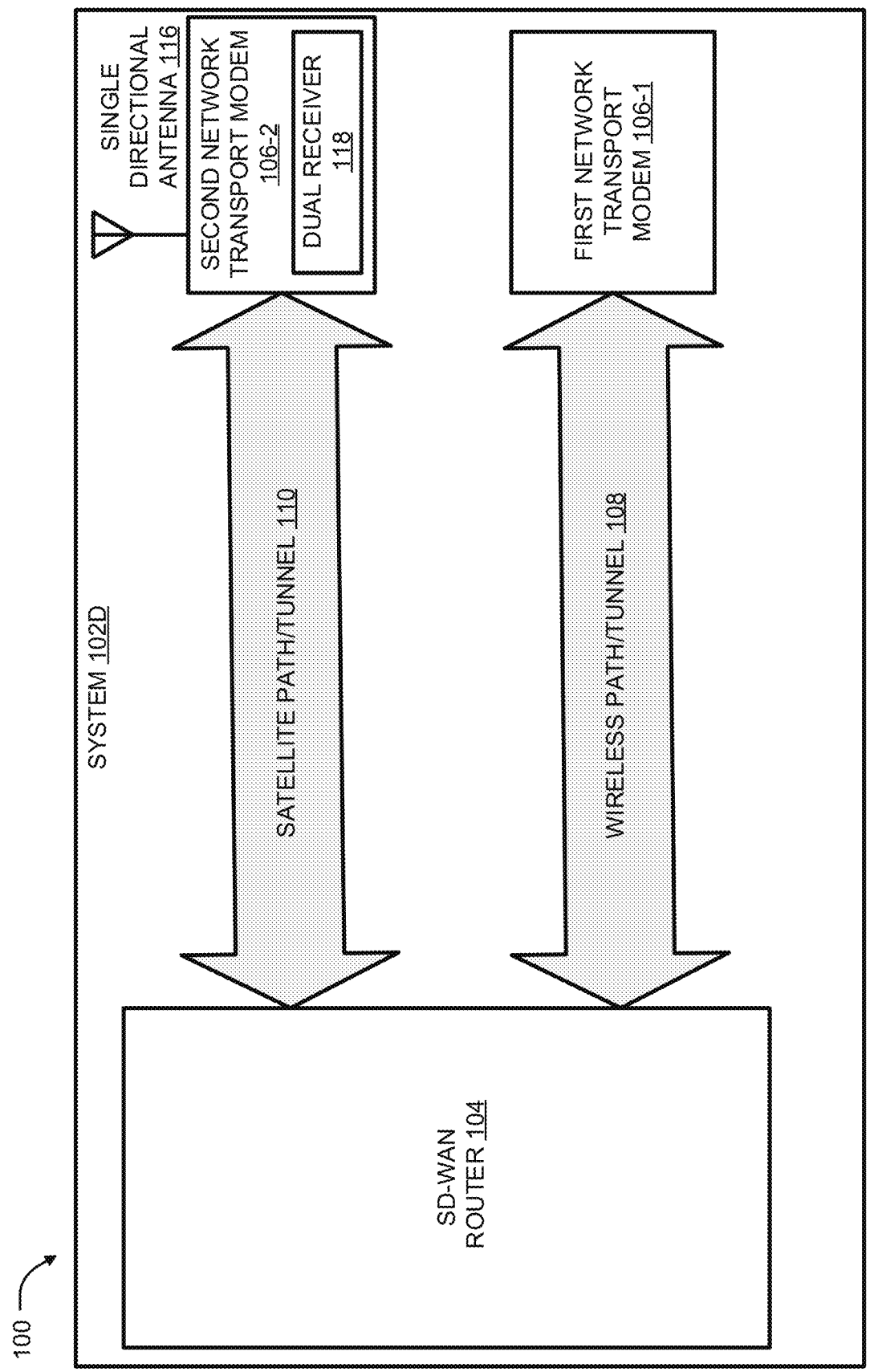
FIG. 1D illustrates a block diagram representing a system, which includes a SD-WAN router, a first network transport modem, and a second network transport modem with a single antenna and a dual receiver, according to an example.

FIG. 1D illustrates a block diagram representing a system 102D, which includes the SD-WAN router 104, the first network transport modem 106-1, and the second network transport modem 106-2 with a single directional antenna 116 and a dual receiver 118, according to an example.

In an example embodiment, the second network transport modem 106-2 may include the single directional antenna 116, to provide a near-hitless handoff from one spot beam to another spot beam. For example, the near-hitless handoff may be a scenario where a handoff causes a WAN transport to briefly (e.g. 20 milliseconds (ms)) lose connectivity. This may be accomplished by having one receiver handle reception of the current spotbeam while having a second receiver prepare for a handoff by configuring the second receiver for the carrier in the second spot beam, using the dual receiver 118. For example, there may be nearly no outage when a handover/handoff takes place as the second receiver in the dual receiver 118 may have already acquired the carrier in the second spotbeam and may immediately handle reception when the handoff takes place. Furthermore, a transmitter (not shown) may be immediately switched to use timing and clock frequency signals from the second receiver to begin transmission after handover. In an embodiment, the second network transport modem 106-2 may correspond to a dual-receiver mobile satellite terminal.

The second network transport modem 106-2 may include the dual receiver 118 to reduce the outage during spot-beam handoff. The spot beams all emanate from a single satellite; hence a single tracking antenna may be required. Typically satellite terminal has an outdoor unit that only supports a single transmit signal at a time, which also provides the entire spectrum to the indoor unit. One satellite receiver may be used for receiving from the current spot beam while the other may be used for preparing to receive (acquiring) the signal from the next spot beam.

FIG. 1E illustrates a block diagram representing a network architecture 100E for a system 102E, which includes a processor and a memory comprising modules, according to an example.

The network architecture 100E may include a system 102E communicatively connected to a remote local areal network (LAN) host 126, 126A, and 126B through a network 128. The network 128 may be, for example, a satellite-based network and/or a wireless-based network. Further, the network architecture 100E may include a public Internet host 130, and a private network host 132. The remote LAN host 126 may communicate with the public Internet host 130 and the private network host 132 via the network 128. The communication involves transmitting data over two different network transport modems, the first network transport modem 106-1 (e.g., wireless technologies, LTE, 4G, 5G, 6G) accessed using a wireless modem (not shown) and the second network transport modem 106-2 (e.g., HTS) accessed using a mobile HTS modem (not shown). However, the use of the two concurrent connections may be transparent to the remote LAN host 126. The remote LAN host 126 may be a host device or endpoint, such as a desktop computer, a laptop computer, a tablet computer, and/or other electronic equipment, to which the SD-WAN router 104 and the SD-WAN gateway 112 provide public Internet access (for example to the public internet host 130 via an internet (not shown)) and private network access (for example to a private network host 132 via a private network intranet (not shown)). Typically, there may be multiple such remote LAN hosts, all of which may concurrently receive network access through the SD-WAN router 104 and the remote LAN(s) (not shown). For example, additional remote LAN hosts 126a, 126b may concurrently transmit and receive data through the SD-WAN router 104 along with the remote LAN host 126.

The system 102E may include a processor 120, and a memory 122. The memory 122 may include processor-executable instructions, which on execution, cause the processor 120 to perform one or more operations described herein. The memory 122 may include one or more modules 124. The modules 124 may include, but are not limited to, an accelerator, a peer accelerator, a classifier, a receiving module, a transmitting module, an assigning module, an estimating module, a prioritizing module, an adjusting module, and/or other modules. Each of these modules when executed by the processor 120 perform one or more functionalities described in the context of the system 102A, 102B, 102C, and 102D.

For example, the receiving module may receive at least one packet for upstream transmission over a communication network. Additionally, the classifier may classify the at least one packet as at least one of an interactive traffic data type and a bulk traffic data type. Further, the assigning module may assign a wireless path associated with a first network transport modem for the upstream transmission of the at least one packet classified as the interactive traffic data type.

In an example embodiment, the estimating module may estimate available capacity for the upstream transmission of the at least one packet, associated with the at least one of the first network transport modem or the second network transport modem, based on the received status information and the latency parameters.

In an example embodiment, the prioritizing module may prioritize the interactive traffic data type and the bulk traffic data type across at least one of the first network transport modem or the second network transport modem, using a rate-limited priority queue, based on the estimated available capacity.

In an example embodiment, the adjusting module may adjust, based on the received status information and the latency parameters, the rate limited priority queue for a continuity of a transmission control protocol (TCP) connection corresponding to the upstream transmission of the at least one packet, responsive to a change in network conditions of the communication network during the upstream transmission. For brevity, the module functionalities are not explained in detail for the downstream transmission of at least one packet.

Figure 2:
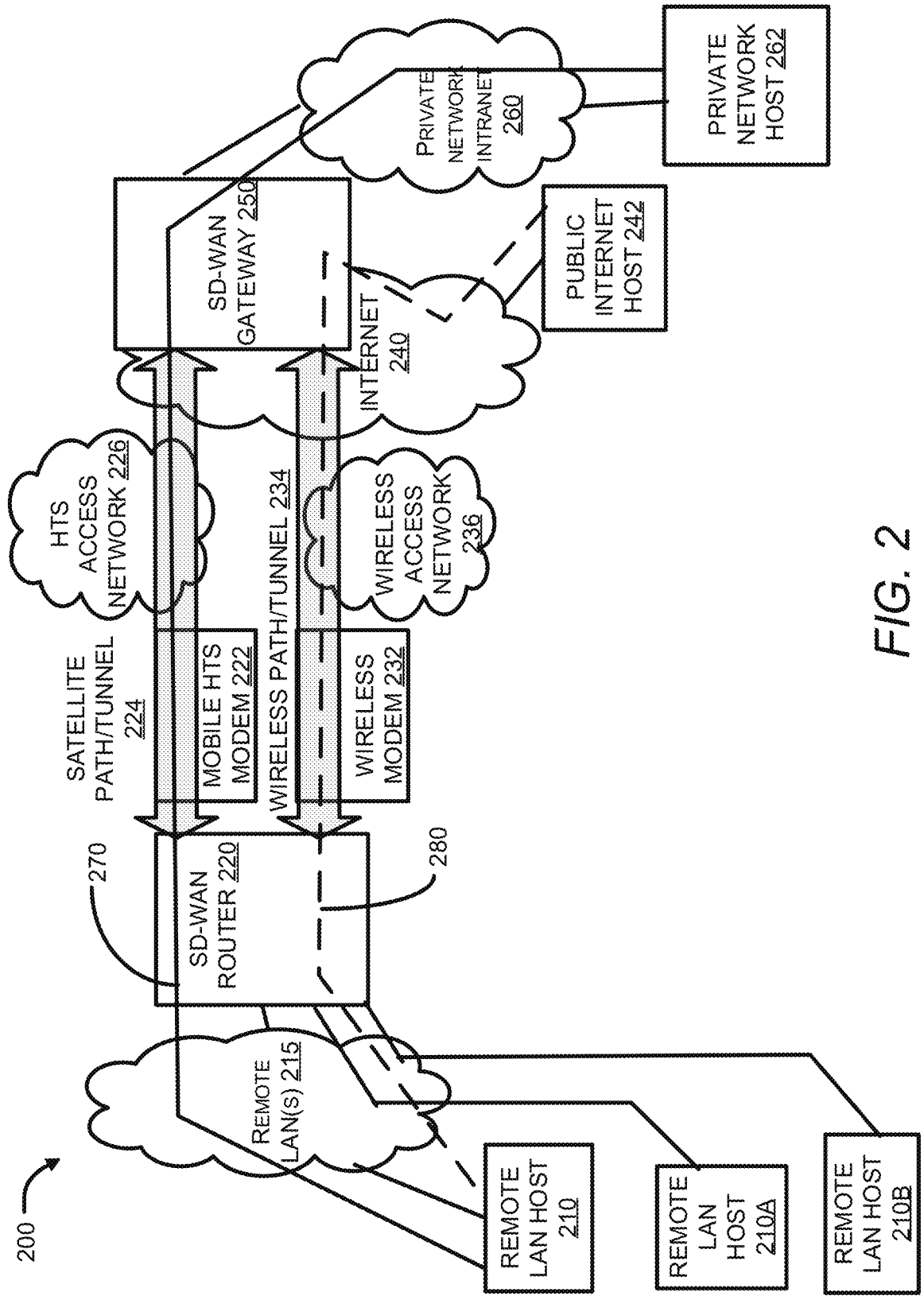
FIG. 2 illustrates a block diagram representing a software-defined wide area network (SD-WAN) architecture, according to an example.

FIG. 2 illustrates a block diagram representing a software-defined wide area network (SD-WAN) architecture 200, according to an example. While an example of FIG. 2 and other examples herein involve two specific network transport modems, e.g., a mobile high-throughput satellite (HTS) modem 222 (e.g., the second network transport modem 106-2 shown in FIGS. 1A and 1B) and a mobile wireless modem 232 (e.g., the first network transport modem 106-1 shown in FIGS. 1A, and 1B), other physical network access technologies or network transport modems may be used, e.g., coaxial cable, fiber-optics, digital subscriber line (DSL), LTE, 5G, 6G, cellular, and/or other wireless technologies. Any combination of these and other network transport modems may be used. The example shows the use of two network transport modems; however more than two transport modems may be used based on implementation requirements. In some scenarios, the techniques may be used with multiple instances of the same type of network transport modem, for example, to provide load balancing among two network connections of the same type (e.g., two different cable Internet connections).

The example of FIG. 2 includes a remote Local area network (LAN) host 210 that communicates with a public internet host 242 and a private network host 262. The communication involves transmitting data over two different network transport modems, a first network transport modem (e.g., wireless technologies, LTE, 4G, 5G, 6G) accessed using a wireless modem 232 and a second network transport (e.g., HTS) accessed using a mobile HTS modem 222. However, the use of the two concurrent connections may be transparent to the remote LAN host 210. The two transport modems may be managed by a software-defined wide area network (SD-WAN) router 220 (similar to SD-WAN router 104 shown in FIG. 1A) and a SD-WAN gateway 250 similar to SD-WAN gateway 112 shown in FIG. 1B) as discussed below. When the remote LAN host 210 sends data packets to transmit, the SD-WAN router 220 evaluates the packets and network conditions to determine which network transport to use (e.g., the mobile HTS modem or the wireless modem) for each packet or a group of packets. For example, the SD-WAN router 220 may classify packets to specify classes of service (e.g., levels of latency) needed for each packet, and then select the most appropriate of the available network transport modems given the class of service. The SD-WAN router 220 then sends each packet to the SD-WAN gateway 250 using the selected network transport modem for the packet, and the SD-WAN gateway 250 sends the packets to the appropriate network hosts. A similar, complementary process may be used to transmit data in the return direction from the SD-WAN gateway 250 to the SD-WAN router 220 and back to the remote LAN host 210. As a result of this technique, the SD-WAN router 220 and the SD-WAN gateway 250 may make use of the concurrently available network transport modems to achieve the advantages of each.

In an embodiment, the SD-WAN router 220, the mobile HTS modem 222, and the wireless modem 232 may be implemented as a mobile terminal (or simply, the terminal). The functionality of the SD-WAN router 220, the mobile HTS modem 222, and the wireless modem 232 may be implemented in a single hardware equipment such as a mobile terminal or a networking apparatus/device.

The remote LAN host 210 may be a host device or endpoint, such as a desktop computer, a laptop computer, a tablet computer, and/or other electronic equipment, to which the SD-WAN router 220 and the SD-WAN gateway 250 provide public Internet access (for example to a public internet host 262 via an internet 140) and private network access (for example to a private network host 242 via a private network intranet 260). Typically, there may be multiple such remote LAN hosts, all of which may concurrently receive network access through the SD-WAN router 220 and the remote LAN(s) 215. For example, additional remote LAN hosts 210a, and 210b may concurrently transmit and receive data through the SD-WAN router 220 along with the remote LAN host 210.

The mobile HTS modem 222 and an HTS access network 226 provide HTS access to the public Internet. The wireless modem 232 and the wireless access network 236 provide wireless access to the public Internet.

Further, remote LAN(s) 215 connect the remote LAN host 210 to the SD-WAN router 220. The SD-WAN router 220 utilizes multiple of broadband transports to provide wide-area-network (WAN) connectivity to the remote LAN hosts 210, 210a, and 210b. The SD-WAN router 220 may forward packets to/from the remote LAN hosts 210, 210a, and 210b to/from the SD-WAN gateway 250 flexibly over the transport modems.

The SD-WAN architecture 200 uses network tunneling to connect the SD-WAN router 220 and the SD-WAN gateway 250. The devices 220, and 250 may use a different tunnel for each network transport modem. A first tunnel, a wireless path/tunnel 234 (similar to wireless path/tunnel 108 shown in FIGS. 1A and 1B) may be established for packets exchanged over the wireless transport modem 232, and a second tunnel, a satellite path/tunnel 224 (similar to satellite path/tunnel 110 shown in FIGS. 1A and 1B), may be established for packets exchanged over the mobile HTS transport modem 222. The satellite path/tunnel 224 and the wireless path/tunnel 234 represent the ability of the SD-WAN router 220 and the SD-WAN gateway 250 to forward packets to each other. The satellite path/tunnel 224 and the wireless path/tunnel 234 may be internet protocol security (IPsec) tunnels when privacy may be required as when private network access may be required or may be a user datagram protocol (UDP) based tunneling mechanism (e.g., unencrypted) when privacy may not be required. Alternatively, they could be another tunneling mechanism or networking mechanism for relaying packets between the SD- WAN router 220 and the SD-WAN gateway 250 over their specific access network. In general, traffic for the satellite path/tunnel 224 may be sent exclusively over the mobile HTS modem 222, and traffic for the wireless path/tunnel 234 may be sent exclusively over the wireless modem 232.

In an embodiment, one or more packets are tunneled between the SD-WAN router 220 and the SD-WAN gateway 250 using a Network Address Translation (NAT) protocol. The SD-WAN gateway 250 may detect a source Internet Protocol (IP) address of the tunnel. Further, the SD-WAN gateway 250 may detect a change in the port ID. The SD-WAN gateway 250 may perform the downstream transmission of the at least one packet to an updated IP address and the port ID of the tunnel. For example, each satellite gateway through which a spot beam may be carried typically performs a Network Address Translation (NAT) operation on data traffic. When a spot beam handoff occurs, all operating transmission control protocol (TCP) (and User Datagram Protocol (UDP)) connections are lost. This may be due to the downstream Internet Protocol (IP) address seen by host devices on a public internet that changes as a result of the movement from one spot beam satellite gateway to the next spot beam satellite gateway.

The systems and methods herein overcome the problem of losing the connections, by using a NAT traversal-friendly tunneling protocol (e.g., IPsec with NAT traversal) to tunnel packets between the SD-WAN router 220 and the SD-WAN gateway 250. When the SD-WAN gateway 250 receives the downstream IP address and port for an HTS tunnel change, the SD-WAN gateway 250 switches the destination address and port of that tunnel's downstream packets, so that as soon as any upstream packet may be carried after a spot beam handoff, the downstream traffic may also be carried to the switched spot beam.

In a preferred embodiment, the SD-WAN router 220 may receive status information indicating that a handoff has occurred. The SD-WAN router 220 may periodically send a stream of upstream packets until a downstream packet carried by the new spot beam may be received to facilitate the SD-WAN gateway 250 switchovers of downstream packets to get through a satellite gateway of the new spot beam.

The SD-WAN gateway 250 terminates tunnels 224, and 234 and has the ability to flexibly forward packets to and from the remote LAN hosts 210, 210*a*, and 210*b* over the satellite tunnel 224 and wireless tunnel 234 via the SD-WAN router 220. The SD-WAN gateway 250 may forward packets to and from a private network intranet 260 and its hosts when private network connectivity is being provided. The SD-WAN gateway 250 may forward packets to and from the public internet 240 and its hosts (optionally by performing a Network Address Translation function) when public internet access is provided.

The SD-WAN router 220 and SD-WAN gateway 250 together implement SD-WAN policies that provide for identifying and classifying unidirectional IP flows and then selecting which tunnel (satellite tunnel 224 or wireless tunnel 234) should carry the IP flow based on the policy and the flow's classification and the measured performance of the WAN transports. Two network connections 270, and 280 are shown in the example diagram, however, tunnels 224, and 234 may concurrently support transfers for many different connections, including connections between different LAN hosts.

The example shows a first network connection 270 (e.g., a transmission control protocol (TCP) connection), which may include a pair of unidirectional IP flows, which connects the remote LAN host 210 to the private network host 262, where the SD-WAN policies determine to carry the flow's packets over the satellite path/tunnel 224 and thus via an HTS broadband transport.

The SD-WAN architecture 200 also illustrates a second connection 280 (e.g., the TCP connection), which may include a pair of unidirectional IP flows, which connects the remote LAN host 210 to the public network host 242, where the SD-WAN policies determine to carry the flow's packets over the wireless tunnel 234 and thus via a wireless broadband transport. The policy's selection of the WAN or WANs that should carry an IP flow's packets may shift over time.

In the SD-WAN architecture 200, the SD-WAN router 220 and SD-WAN gateway 250 may classify traffic and assign it to different tunnels 224, and 234 at different levels of granularity. For example, tunnels 224, and 234 for traffic may be assigned for a connection 270, and 280, on an IP flow basis (e.g., for each IP flow with a connection being assigned separately), for groups of packets, or individual packets. After traffic may be assigned to a tunnel, the SD-WAN router 220 and the SD-WAN gateway 150 may periodically re-evaluate the assignment. In some cases, the re-evaluation occurs periodically, for example, after a predetermined interval of time or after a predetermined amount of data for the connection or IP flow may be received or transmitted. In some implementations, the SD-WAN router 220 and the SD-WAN gateway 250 may each evaluate data to be transmitted on an individual packet-by-packet basis or as groups of packets. As a result, as incoming packets of a connection are received, each packet or group of packets may be newly evaluated in view of current network conditions (including the queue depths of the different tunnels 224, 234) and may be assigned to achieve the best overall performance, e.g., lowest latency, lowest cost, or other metric, which may vary based on the class of service indicated by the classification of the packets.

As an example, although connection 280 may be initially assigned to the wireless tunnel 234 as illustrated, network conditions may change, e.g., due to changing a throughput or latency of one of the network transports, changing a level of congestion on one of the network transports, etc. The transmission queue for the wireless tunnel 234 may increase to the point that the overall expected latency, e.g., the time between adding a packet to the transmission queue and receipt of the packet at the SD-WAN gateway 250, may be higher for the wireless modem 232 than for the mobile HTS modem 222. As a result, some, or all the data for the connection 280 may be assigned to the satellite tunnel 224 for the mobile HTS modem 222. In this way, data for the connection 280 may be carried on either transport modems that provide the best latency, or may be carried on (e.g., split across) a combination of multiple transport modems to achieve the best overall performance.

This technology provides for optimized public internet access or optimized private network access where two internet connections are utilized. (a mobile HTS connection and a wireless connection), where IP flows are classified (and perhaps dynamically reclassified) so that bulk transfers are carried by the lower-usage cost connection (typically the HTS connection) and so that the interactive traffic may be carried by wireless connection alone, so that the latency during a handoff is seamless.

The disclosed technology extends the functionality of an SD-WAN solution with a QoS overlay which leverages the QoS provided by an HTS access network and provides for QoS over the wireless access network. It optimizes Interactive Traffic in several ways. First, the router 220 or gateway 250 may cause a startup handshake packet (or startup set of packets) of an Interactive IP-flow to be carried over wireless access network with a very high-priority (e.g., very low-latency) class-of-service. Second, the router 220 or gateway 250 may cause a non-startup handshake packet of an Interactive IP-flow to be carried with a high-priority (low-latency) class-of-service, but potentially one which has a lower priority than the startup handshake class of service. This non-startup handshake packet may be sent over the network transport or access network which may be estimated to provide lower latency for that packet.

In an example embodiment, the estimation may be based on a combination of one or more of the following: (i) the estimated lightly-loaded or baseline latency of the access network, (ii) the estimated throughput available to carry packets at this particular class-of-service, and (iii) the total amount of data represented by the packets at that class of service which are queued up awaiting transmission. In other words, the estimation may consider the time needed to clear the transmission queue for a specific class of service on a specific network transport to determine the latency most likely to be experienced. Third, on the receiving end of the two tunnels 224, and 234, the receiving device (e.g., either the router 220 or gateway 250) may enable packets of the IP flow back in sequence when its packets are carried by multiple tunnels.

The SD-WAN router 220 and the SD-WAN gateway 250 may assign bulk transfer IP flows to be carried over the lower-cost transport, at a lower-priority class of service, to reduce the impact of the bulk traffic on the latency experienced by the high-priority (e.g., low-latency) classes of service.

The disclosed technology includes provisions for monitoring wireless usage against usage limits and for incrementally reducing the fraction of traffic carried via wireless as the usage limits are approached. One technique for reducing that usage may be increasingly overestimating the latency that an interactive packet should expect from the wireless access network. Another technique may be increasing the priority levels which are carried over the lower-cost transport (e.g., HTS) and adjusting (e.g., typically reducing) the amount of data carried by an IP flow for the higher-cost transport (e.g., wireless modem) prior to its demotion to such a level. A third technique involves progressively underestimating the capacity of the wireless connection.

Although devices 220 and 250 are described as being implemented through SD-WAN techniques, this is only one example. The devices 220 and 250 may optionally be implemented without SD-WAN techniques.

The disclosed technology may be implemented for managing a handoff in a software-defined wide area network (SD-WAN) in aero or mobility situations, where a terminal may be switching across multiple high throughput satellite (HTS), low-latency wireless spot beams, and cells.

The SD-WAN architecture 200 may use an agile switched agile-switching active-path (ASAP) technique in aero or mobility situations. The SD-WAN architecture 200 may be specifically adapted to aero, maritime, and land mobile settings where a terminal may be shifting occasionally from one spot beam to another spot beam, and/or one satellite to another satellite, or shifting from one wireless cell to another cell.

Figure 3:
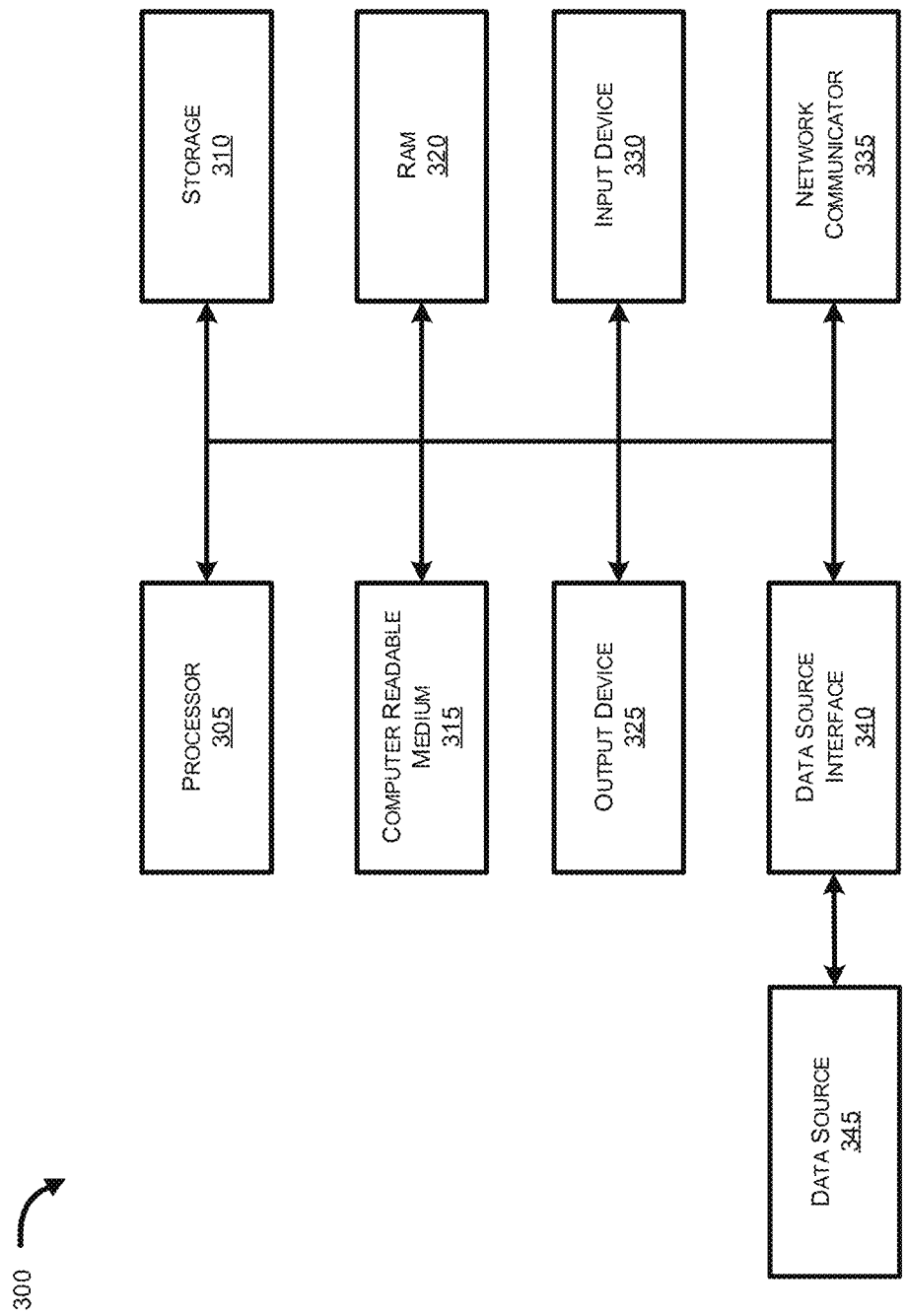
FIG. 3 illustrates a block diagram representing a computer system, according to an example.

FIG. 3 illustrates a block diagram representing a computer system 300, according to an example. The computer system 300 may be part of or any one of the system 102, the SD-WAN router 104, the gateway 106, and the network transport modems 112, as shown in the network architecture 100 to perform the functions and features described herein. The computer system 300 may include, among other things, an interconnect 310, a processor 312, a multimedia adapter 314, a network interface 316, a system memory 318, and a storage adapter 320.

The interconnect 310 may interconnect various subsystems, elements, and/or components of the computer system 300. As shown, the interconnect 310 may be an abstraction that may represent any one or more separate physical buses, point-to-point connections, or both, connected by appropriate bridges, adapters, or controllers. In some examples, the interconnect 310 may include a system bus, a peripheral component interconnect (PCI) bus or PCI-Express bus, a Hyper Transport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 310 may allow data communication between the processor 312 and system memory 318, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 312 may be the central processing unit (CPU) of the computing device and may control an overall operation of the computing device. In some examples, the processor 312 may accomplish this by executing software or firmware stored in system memory 318 or other data via the storage adapter 320. The processor 312 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 314 may connect to various multimedia elements or peripherals. These may include a device associated with visual (e.g., video card or display), audio (e.g., sound card or speakers), and/or various input/output interfaces (e.g., mouse, keyboard, touchscreen).

The network interface 316 may provide the computing device with an ability to communicate with a variety of remove devices over a network and may include, for example, an Ethernet adapter, a Fiber Channel adapter, and/or another wired- or wireless-enabled adapter. The network interface 316 may provide a direct or indirect connection from one network element to another and facilitate communication between various network elements.

The storage adapter 320 may connect to a standard computer-readable medium for storage and/or retrieval of information, such as a fixed disk drive (internal or external).

Many other devices, components, elements, or subsystems (not shown) may be connected in a similar manner to the interconnect 310 or via a network. Code or computer-readable instructions to implement the dynamic approaches for payment gateway selection and payment transaction processing of the systems and methods may be stored in computer-readable storage media such as one or more of system memory 318 or other storage. Code or computer-readable instructions to implement the dynamic approaches for payment gateway selection and payment transaction processing of the systems and methods may also be received via one or more interfaces and stored in memory. The operating system provided on computer system 300 may be MS-DOS®, MS-WINDOWS®, OS/2®, OS X®, IOS®, ANDROID®, UNIX®, Linux®, or another operating system.

Figure 4:
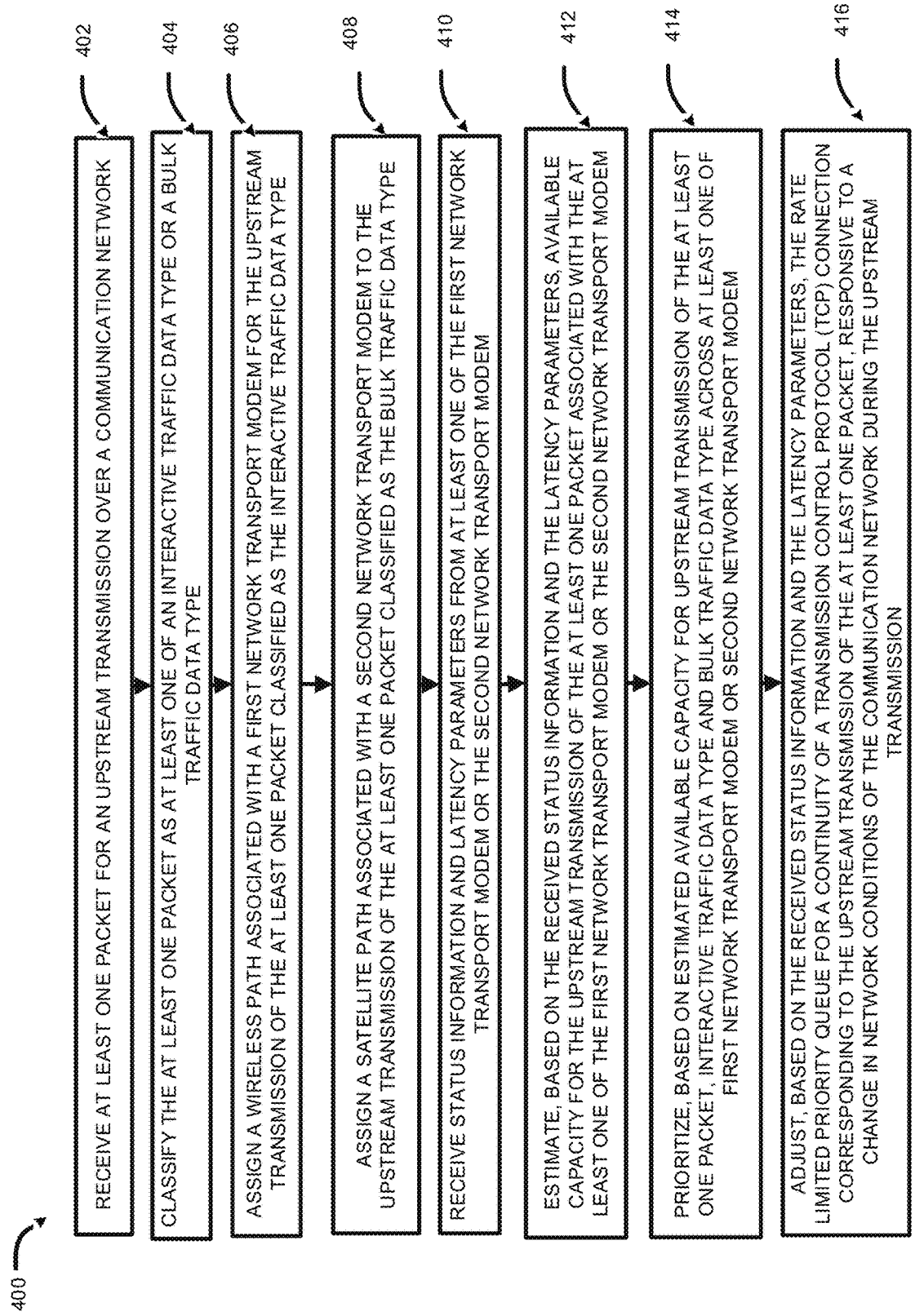
FIG. 4 illustrates a flow diagram representing a method of managing a handoff in a software-defined wide area network (SD-WAN) in aero or mobility situations, according to an example.

FIG. 4 illustrates a flow diagram representing a method 400 of managing a handoff in a software-defined wide area network (SD-WAN) in aero or mobility situations, according to an example. The disclosed method may be performed by one or more components of the system (102A, 102B, 102C, 102D, 102E) disclosed herein. For example, with reference to FIG. 1E, the steps disclosed herein may be performed by a processor. In yet another example, some of the steps disclosed herein may be performed by the SD-WAN router 104.

At block 402, the method 400 may include receiving at least one packet for an upstream transmission over a communication network.

At block 404, the method 400 may include classifying the at least one packets at least one of an interactive traffic data type or a bulk traffic data type.

At block 406, the method 400 may include assigning a wireless path associated with a first network transport modem 106-1 for the upstream transmission of the at least one packet classified as the interactive traffic data type.

At block 408, the method 400 may include assigning a satellite path associated with a second network transport modem 106-2 for the upstream transmission of the at least one packet classified as the bulk traffic data type.

At block 410, the method 400 may include receiving status information and latency parameters from at least one of the first network transport modem 106-1 or the second network transport modem 106-2. The status information includes at least one of a wireless cell Identity (ID) received from the first network transport modem 106-1 or a satellite spot beam Identity (ID) received from the second network transport modem 106-2.

At block 412, the method 400 may include estimating, based on the received status information and the latency parameters, the available capacity for the upstream transmission of the at least one packet associated with the at least one of the first network transport modem 106-1 or the second network transport modem 106-2. The available capacity for the upstream transmission of the at least one packet varies in response to a change in the spot beam ID or the wireless cell ID.

At block 414, the method 400 may include prioritizing, based on the estimated available capacity for the upstream transmission of the at least one packet, the interactive traffic data type, and the bulk traffic data type across at least one of the first network transport modem 106-1 or the second network transport modem 106-2. The interactive traffic data type and the bulk traffic data type is prioritized using a rate-limited priority queue.

At block 416, the method 400 may include adjusting, based on the received status information and the latency parameters, the rate limited priority queue for a continuity of a transmission control protocol (TCP) connection corresponding to the upstream transmission of the at least one packet, responsive to a change in network conditions of the communication network during the upstream transmission.

The order in which the method 400 is described is not intended to be construed as a limitation, and any number of the described method blocks may be combined or otherwise performed in any order to implement the method 400 or an alternate method. Additionally, individual blocks may be deleted from the method 400 without departing from the spirit and scope of the ongoing description. Furthermore, the method 400 may be implemented in any suitable hardware, software, firmware, or a combination thereof, that exists in the related art or that is later developed. The method 400 describes, without limitation, the implementation of the system 102. A person of skill in the art will understand that method 400 may be modified appropriately for implementation in various manners without departing from the scope and spirit of the ongoing description.

One of ordinary skill in the art will appreciate that techniques consistent with the ongoing description are applicable in other contexts as well without departing from the scope of the ongoing description.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for managing handoff.

It should also be appreciated that the systems and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, such as high throughput satellite (HTS) systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

It should be appreciated that the systems and methods described herein may also be used to help provide, directly or indirectly, measurements for distance, angle, rotation, speed, position, wavelength, transmissivity, and/or other related tests and measurements.

What has been described and illustrated herein are examples of the implementation along with some variations. The terms, descriptions, and figures used herein are set forth by way of illustration only and are not meant as limitations. Many variations are possible within the scope of the implementations, which is intended to be defined by the following claims—and their equivalents—in which all terms are meant in their broadest reasonable sense unless otherwise indicated.

The invention claimed is:

1. A system, comprising:
   a software-defined wide area network (SD-WAN) router, wherein the SD-WAN router comprises:
   a processor; and
   a memory coupled to the processor, wherein the memory comprises processor-executable instructions, which on execution, cause the processor to:
   receive at least one packet for an upstream transmission over a communication network;
   classify the at least one packet as at least one of an interactive traffic data type or a bulk traffic data type;
   assign a wireless path associated with a first network transport modem for the upstream transmission of the at least one packet classified as the interactive traffic data type;
   assign a satellite path associated with a second network transport modem for the upstream transmission of the at least one packets classified as the bulk traffic data type;
   receive status information and latency parameters from at least one of the first network transport modem or the second network transport modem, wherein the status information comprises at least one of: a wireless cell Identity (ID) received from the first network transport modem; or a satellite spot beam Identity (ID) received from the second network transport modem;
   estimate, based on the received status information and the latency parameters, available capacity for the upstream transmission of the at least one packets associated with the at least one of the first network transport modem or the second network transport modem;
   prioritize, based on the estimated available capacity for the upstream transmission of the at least one packet, the interactive traffic data type, and the bulk traffic data type across at least one of the first network transport modem or the second network transport modem, wherein the interactive traffic data type and the bulk traffic data type is prioritized using a rate-limited priority queue; and
   adjust, based on the received status information and the latency parameters, the rate limited priority queue for a continuity of a transmission control protocol (TCP) connection corresponding to the upstream transmission of the at least one packets, responsive to a change in network conditions of the communication network during the upstream transmission.

2. The system of claim 1, further comprises:
   a software defined wide area network (SD-WAN) gateway to:
   receive at least one packet for a downstream transmission over the communication network;
   classify the at least one packet as at least one of the interactive traffic data type or the bulk traffic data type;
   assign the wireless path associated with the first network transport modem for the downstream transmission of the at least one packet classified as the interactive traffic data type;
   assign the satellite path associated with the second network transport modem for the downstream transmission of the at least one packet classified as the bulk traffic data type;
   receive status information and latency parameters from at least one of the first network transport modem or the second network transport modem, wherein the status information comprises at least one of: the wireless cell Identity (ID) received from the first network transport modem; or the satellite spot beam Identity (ID) received from the second network transport modem;
   estimate, based on the received status information and the latency parameters, available capacity for the downstream transmission of the at least one packet, associated with the at least one of the first network transport modem or the second network transport modem;
   prioritize, based on the estimated available capacity for the downstream transmission of the at least one packet, the interactive traffic data type, and the bulk traffic data type across at least one of the first network transport modem or the second network transport modem, wherein the interactive traffic data type and the bulk traffic data type is prioritized using a rate-limited priority queue; and
   adjust, based on the received status information and the latency parameters, the rate limited priority queue for a continuity of a transmission control protocol (TCP) connection corresponding to the downstream transmission of the at least one packet, responsive to a change in network conditions of the communication network during the downstream transmission.

3. The system of claim 2, wherein the first network transport modem corresponds to a mobile wireless modem/terminal, and the second network transport modem corresponds to a mobile high-throughput satellite (HTS) modem/terminal.

4. The system of claim 2, wherein the available capacity for the downstream transmission of the at least one packet varies responsive to a change in at least one of the wireless cell ID or the satellite spot beam ID.

5. The system of claim 2, wherein the change in the network conditions is responsive to one or more of: a spot beam handoff event, a change in throughput or latency of the first network transport modem or the second network transport modem, a change in a level of congestion on at least one of the first network transport modem or the second network transport modem, a change in destination address and a port address of the wireless path or the satellite path respectively, a change in signal strength or quality to accelerate during the estimation of the available capacity, a change in upstream or a downstream modulation and a Forward Error-correcting Code (FEC), and a change in packet-loss.

6. The system of claim 2 further comprises a router and a gateway, where the at least one packet are received via a tunnel between the router and the gateway using a Network Address Translation (NAT) protocol, wherein the gateway detects a source Internet Protocol (IP) address of the tunnel and change in port ID and performs a downstream transmission of packet to an updated IP address and a port.

7. The system of claim 2, wherein the continuity of the TCP connections is optimized using a TCP performing enhancing proxied (PEP'ed) technique, wherein the TCP connections comprises unacknowledged backbone connection packets that is in an outage, wherein the processor shifts the unacknowledged backbone connection packets to a remaining WAN connection until the TCP connections are acknowledged.

8. The system of claim 2, wherein the received status information from the first network transport modem comprises at least one of a connectivity status, the wireless cell ID, an estimated upstream capacity, and an estimated downstream capacity, wherein the received status information from the second network transport modem comprises at least one of a connectivity status, the spot beam ID, an estimated upstream and a downstream capacity, a upstream modulation and/or a Forward Error-Correcting Code (FEC) setting, a downstream modulation and/or a Forward Error-Correcting Code (FEC) setting, and a downstream signal strength or quality.

9. The system of claim 2, wherein the status information and the latency parameters comprise at least one of an excessive latency, a packet loss, status information from the first network transport modem and the second network transport modem, and brief throughput tests when entering a new spot beam or a cell.

10. The system of claim 1, wherein the first network transport modem corresponds to a mobile wireless modem/terminal, and the second network transport modem corresponds to a mobile high-throughput satellite (HTS) modem/terminal.

11. The system of claim 1, wherein the available capacity for the upstream transmission of the at least one packet varies responsive to a change in at least one of the wireless cell ID or the satellite spot beam ID.

12. The system of claim 1, wherein the change in the network conditions is responsive to one or more of: a spot beam handoff event, a change in throughput or latency of the first network transport modem or the second network transport modem, a change in a level of congestion on at least one of the first network transport modem or the second network transport modem, a change in destination address and a port address of the wireless path or the satellite path respectively, a change in signal strength or quality to accelerate during the estimation of the available capacity, a change in upstream or a downstream modulation and a Forward Error-correcting Code (FEC), and a change in packet-loss.

13. The system of claim 1, wherein the processor-executable instructions, which on execution, cause the processor further to:
estimate a latency of the at least one packet;
factor the estimated latency of the at least one packet across the at least one of the first network transport modem or the second network transport modem, to assign the wireless path or the satellite path; and
assign an uncongested latency from the estimated latency of at least one packet, and a backlog of the at least one packet waiting to be transmitted to the rate limited priority queue.

14. The system of claim 1, wherein the second network transport modem comprises one of a directional antenna and a single directional antenna, to provide a near-hitless handoff from one spot beam to another spot beam, by receiving from a dual receiver, the at least one packet from a current spot beam, and subsequently receiving the at least one packet from another spot beam.

15. The system of claim 1 further comprises a router and a gateway, where the at least one packets are transmitted via a tunnel between the router and the gateway using a Network Address Translation (NAT) protocol, wherein the gateway detects a source Internet Protocol (IP) address of the tunnel and change in port ID and performs a downstream transmission of at least one packet to an updated IP address and a port.

16. The system of claim 1, wherein the processor tags the at least one packet with a class of service to provide preference to a reduced latency of the at least one packet that correspond to a startup handshake packets associated with a connection.

17. The system of claim 1, wherein the continuity of the TCP connections is optimized using a TCP performing enhancing proxied (PEP'ed) technique, wherein the TCP connections comprises unacknowledged backbone connection packets that is in an outage, wherein the processor shifts the unacknowledged backbone connection packets to a remaining WAN connection until the TCP connections are acknowledged.

18. The system of claim 1, wherein the received status information from the first network transport modem comprises at least one of a connectivity status, the wireless cell ID, an estimated upstream capacity, and an estimated downstream capacity, wherein the received status information from the second network transport modem comprises at least one of a connectivity status, the spot beam ID, an estimated upstream and a downstream capacity, a upstream modulation and/or a Forward Error-Correcting Code (FEC) setting, a downstream modulation and/or a Forward Error-Correcting Code (FEC) setting, and a downstream signal strength or quality.

19. The system of claim 1, wherein the status information and the latency parameters comprise at least one of an excessive latency, a packet loss, status information from the first network transport modem and the second network transport modem, and brief throughput tests when entering a new spot beam or a cell.

20. A system comprising:
at least one of a first network transport modem or a second network transport modem to:
transmit status information and latency parameters, wherein the status information comprises at least one of a wireless cell Identity (ID) associated with the first network transport modem or a satellite spot beam Identity (ID) associated with the second network transport modem;
an accelerator to:
receive at least one packet for an upstream transmission over a communication network;
classify the at least one packet as at least one of an interactive traffic data type or a bulk traffic data type;

assign a wireless path associated with a first network transport modem for the upstream transmission of the at least one packet classified as the interactive traffic data type;
assign a satellite path associated with a second network transport modem for the upstream transmission of the at least one packet classified as the bulk traffic data type;
receive status information and latency parameters from at least one of the first network transport modem or the second network transport modem, wherein the status information comprises at least one of: a wireless cell Identity (ID) received from the first network transport modem, or a satellite spot beam Identity (ID) received from the second network transport modem;
estimate, based on the received status information and the latency parameters, available capacity for the upstream of the at least one packet associated with the at least one of the first network transport modem or the second network transport modem, wherein the available capacity for the upstream of the at least one packet varies response to a change in the spot beam ID or the wireless cell ID;
prioritize, based on the estimated available capacity for the upstream transmission of the at least one packet, the interactive traffic data type and the bulk traffic data type across at least one of the first network transport modem or the second network transport modem, wherein the interactive traffic data type and the bulk traffic data type is prioritized using a rate-limited priority queue; and
adjust, based on the received status information and the latency parameters, the rate limited priority queue for a continuity of a transmission control protocol (TCP) connection corresponding to the upstream transmission of the at least one packet responsive to a change in network conditions of the communication network during the upstream transmission.

21. The system of claim 20 further comprises:
a peer accelerator to:
receive at least one packet for a downstream transmission over the communication network;
classify the at least one packet as at least one of the interactive traffic data type or the bulk traffic data type;
assign a wireless path associated with a first network transport modem for the downstream transmission of the at least one packet classified as the interactive traffic data type;
assign a satellite path associated with a second network transport modem for the downstream transmission of the at least one packet classified as the bulk traffic data type;
receive status information and latency parameters from at least one of the first network transport modem or the second network transport modem, wherein the status information comprises at least one of a wireless cell Identity (ID) received from the first network transport modem or a satellite spot beam Identity (ID) received from the second network transport modem;
estimate, based on the received status information and the latency parameters, available capacity for the downstream transmission of the at least one packet associated with the at least one of the first network transport modem or the second network transport modem, wherein the available capacity for the downstream transmission of the at least one packet varies response to a change in the spot beam ID or the wireless cell ID;
prioritize, based on the estimated available capacity for the downstream transmission of the at least one packet, the interactive traffic data type, and the bulk traffic data type across at least one of the first network transport modem or the second network transport modem, wherein the interactive traffic data type and the bulk traffic data type is prioritized using a rate-limited priority queue; and
adjust, based on the received status information and the latency parameters, the rate limited priority queue for a continuity of a transmission control protocol (TCP) connection corresponding to the downstream transmission of the at least one packet, responsive to a change in network conditions of the communication network during the downstream transmission.

22. A method comprising:
receiving at least one packet for an upstream transmission over a communication network;
classifying the at least one packet as at least one of an interactive traffic data type or a bulk traffic data type;
assigning a wireless path associated with a first network transport modem for the upstream transmission of the at least one packet classified as the interactive traffic data type;
assigning a satellite path associated with a second network transport modem for the upstream transmission of the at least one packet classified as the bulk traffic data type;
receiving status information and latency parameters from at least one of the first network transport modem or the second network transport modem, wherein the status information comprises at least one of a wireless cell Identity (ID) received from the first network transport modem or a satellite spot beam Identity (ID) received from the second network transport modem;
estimating, based on the received status information and the latency parameters, available capacity for the upstream transmission of the at least one packet, associated with the at least one of the first network transport modem or the second network transport modem;
prioritizing, based on the estimated available capacity for the upstream transmission of the at least one packet, the interactive traffic data type, and the bulk traffic data type across at least one of the first network transport modem or the second network transport modem, wherein the interactive traffic data type and the bulk traffic data type is prioritized using a rate-limited priority queue; and
adjusting, based on the received status information and the latency parameters, the rate limited priority queue for a continuity of a transmission control protocol (TCP) connection corresponding to the upstream transmission of the at least one packet, responsive to a change in network conditions of the communication network during the upstream transmission.

23. The method of claim 22 further comprises:
receiving at least one packet for a downstream transmission over the communication network;
classifying the at least one packet as at least one of the interactive traffic data type and the bulk traffic data type;
assigning the wireless path associated with the first network transport modem for the downstream transmission of the at least one packet classified as the interactive traffic data type;

assigning the satellite path associated with the second network transport modem for the downstream transmission of the at least one packet classified as the bulk traffic data type;
receiving status information and latency parameters from at least one of the first network transport modem or the second network transport modem, wherein the status information comprises at least one of the wireless cell Identity (ID) received from the first network transport modem or the satellite spot beam Identity (ID) received from the second network transport modem;
estimating, based on the received status information and the latency parameters, available capacity for the downstream transmission of the at least one packet, associated with the at least one of the first network transport modem or the second network transport modem;
prioritizing, based on the estimated available capacity for the downstream transmission of the at least one packet, the interactive traffic data type, and the bulk traffic data type across at least one of the first network transport modem or the second network transport modem, wherein the interactive traffic data type and the bulk traffic data type is prioritized using a rate-limited priority queue; and
adjusting, based on the received status information and the latency parameters, the rate limited priority queue for a continuity of a transmission control protocol (TCP) connections corresponding to the downstream transmission of the at least one packet, responsive to a change in network conditions of the communication network during the downstream transmission.

24. The method of claim 22 further comprises:
estimating a latency of the at least one packet;
factoring the estimated latency of the at least one packet across the at least one of the first network transport modem or the second network transport modem, to assign the wireless path or the satellite path; and
assigning an uncongested latency from the estimated latency of the at least one packet, and a backlog of the at least one packet waiting to be transmitted to the rate limited priority queue.

25. The method of claim 22, wherein the method further comprises tagging the at least one packet with a class of service to provide preference to a reduce latency of the at least one packet that corresponds to a startup handshake packets associated with a connection.

26. The method of claim 22, wherein the continuity of the TCP connections is optimized using a TCP performing enhancing proxied (PEP'ed) technique, wherein the TCP connections comprises unacknowledged backbone connection packets that is in an outage, wherein the method further comprises shifting the unacknowledged backbone connection packets to a remaining WAN connection until the TCP connections are acknowledged.

27. The method of claim 22, wherein the received status information from the first network transport modem comprises at least one of a connectivity status, the wireless cell ID, an estimated upstream capacity, and an estimated downstream capacity, and wherein the received status information from the second network transport modem comprises at least one of a connectivity status, the spot beam ID, an estimated upstream and a downstream capacity, a upstream modulation and/or a Forward Error-Correcting Code (FEC) setting, a downstream modulation and/or a Forward Error-Correcting Code (FEC) setting, and a downstream signal strength or quality.

28. A non-transitory computer-readable medium comprising machine-readable instructions that are executable by a processor to:
receive at least one packet for an upstream transmission and a downstream transmission over a communication network;
classify the at least one packet as at least one of an interactive traffic data type or a bulk traffic data type;
assign a wireless path associated with a first network transport modem for the upstream transmission and the downstream transmission of the at least one packet classified as the interactive traffic data type;
assign a satellite path associated with a second network transport modem for the upstream transmission and the downstream transmission of the at least one packet classified as the bulk traffic data type;
receive status information and latency parameters from at least one of the first network transport modem or the second network transport modem, wherein the status information comprises at least one of a wireless cell Identity (ID) received from the first network transport modem or a satellite spot beam Identity (ID) received from the second network transport modem;
estimate, based on the received status information and the latency parameters, available capacity for the upstream transmission and the downstream transmission of the at least one packet associated with the at least one of the first network transport modem or the second network transport modem, wherein the available capacity for the upstream transmission and the downstream transmission of the at least one packet varies responsive to a change in the spot beam ID or the wireless cell ID;
prioritize, based on the estimated available capacity for the upstream transmission and the downstream transmission of the at least one packet, the interactive traffic data type and the bulk traffic data type across at least one of the first network transport modem or the second network transport modem, wherein the interactive traffic data type and the bulk traffic data type is prioritized using a rate-limited priority queue; and
adjust, based on the received status information and the latency parameters, the rate limited priority queue for a continuity of a transmission control protocol (TCP) connection corresponding to the upstream transmission and the downstream transmission of the at least one packet responsive to a change in network conditions of the communication network during the downstream transmission.

* * * * *